United States Patent
Nesper et al.

(10) Patent No.: US 9,929,405 B2
(45) Date of Patent: Mar. 27, 2018

(54) ELECTRODE COMPRISING A TRANSITION METAL OXIDENITRIDE OR A NITROGEN-DOPED TRANSITION METAL OXIDE AS ELECTRONICALLY ACTIVE MATERIAL

(75) Inventors: Reinhard Nesper, Amden (CH); Xiao-Jun Wang, Zurich (CH); Frank Krumeich, Zurich (CH)

(73) Assignee: Belenos Clean Power Holding AG, Bienne (CH)

( * ) Notice: Subject to any disclaimer, the term of this patent is extended or adjusted under 35 U.S.C. 154(b) by 820 days.

(21) Appl. No.: 13/084,118

(22) Filed: Apr. 11, 2011

(65) Prior Publication Data
US 2011/0305949 A1    Dec. 15, 2011

(30) Foreign Application Priority Data
Apr. 12, 2010   (EP) .................................... 10003852

(51) Int. Cl.
H01M 4/58    (2010.01)
H01M 10/052    (2010.01)

(52) U.S. Cl.
CPC ....... H01M 4/5825 (2013.01); H01M 10/052 (2013.01)

(58) Field of Classification Search
CPC ......................... H01M 4/5825; H01M 10/052
See application file for complete search history.

(56) References Cited

U.S. PATENT DOCUMENTS

| 2002/0195591 | A1* | 12/2002 | Ravet ....................... H01B 1/24 252/500 |
| 2005/0058907 | A1* | 3/2005 | Kurihara et al. ............. 429/232 |
| 2007/0128884 | A1 | 6/2007 | Ota et al. |
| 2008/0187831 | A1 | 8/2008 | Barker |
| 2009/0136850 | A1* | 5/2009 | Yoon et al. .............. 429/231.95 |

(Continued)

FOREIGN PATENT DOCUMENTS

EP    1 702 683 A1    9/2006

OTHER PUBLICATIONS

J. Cabana, et al., "Oxynitrides as Electrode Materials for Lithium-Ion Batteries", Journal of The Electrochemical Society, vol. 152, No. 11, XP-002590452, Oct. 7, 2005, pp. A2246-A2255.

(Continued)

*Primary Examiner* — Ula C Ruddock
*Assistant Examiner* — Frank Chernow
(74) *Attorney, Agent, or Firm* — Oblon, McClelland, Maier & Neustadt, L.L.P.

(57) ABSTRACT

An electrode comprises a conductor and an electrode coating, said electrode coating comprising as electronically active material a transition metal (T) oxidenitride of formula $Li_x T'_m T''_n N_y O_z$ in form of nanoparticles, wherein $x=0-3$, $y+z=2-4$, $y>0$, $z>=0.25$, $m+n=1$, $m=0-1$, $n=0-1$, $T'$ and $T''$ both being transition metals of the groups IVB, VB, VIB and VIIB, and periods 3d, 4d and 5d, in particular transition metals selected from Zr, Nb, Mo, Ti, V, Cr, W, Mn, Ni, Co, Fe and Cu. Dependent on the kind of transition metal, its oxidation state and the Li content, such materials may be used as anode materials or as cathode materials, respectively.

12 Claims, 21 Drawing Sheets

(56) References Cited

U.S. PATENT DOCUMENTS

| | | | |
|---|---|---|---|
| 2009/0194410 A1* | 8/2009 | Schroeder | H01L 28/65 204/290.08 |
| 2009/0208847 A1* | 8/2009 | Kang | 429/231.5 |
| 2010/0209782 A1* | 8/2010 | Choi et al. | 429/332 |

OTHER PUBLICATIONS

Jordi Cabana, et al., The first lithium manganese oxynitride, $Li_{7.9}MnN_{5-y}O_y$: preparation and use as electrode material in lithium batteries, Journal of Materials Chemistry Communication, vol. 13, XP-002590453, Aug. 26, 2003, pp. 2402-2404.

European Search Report dated Jul. 6, 2010, in European Patent Application No. 10003852.0, filed Apr. 12, 2010.

* cited by examiner

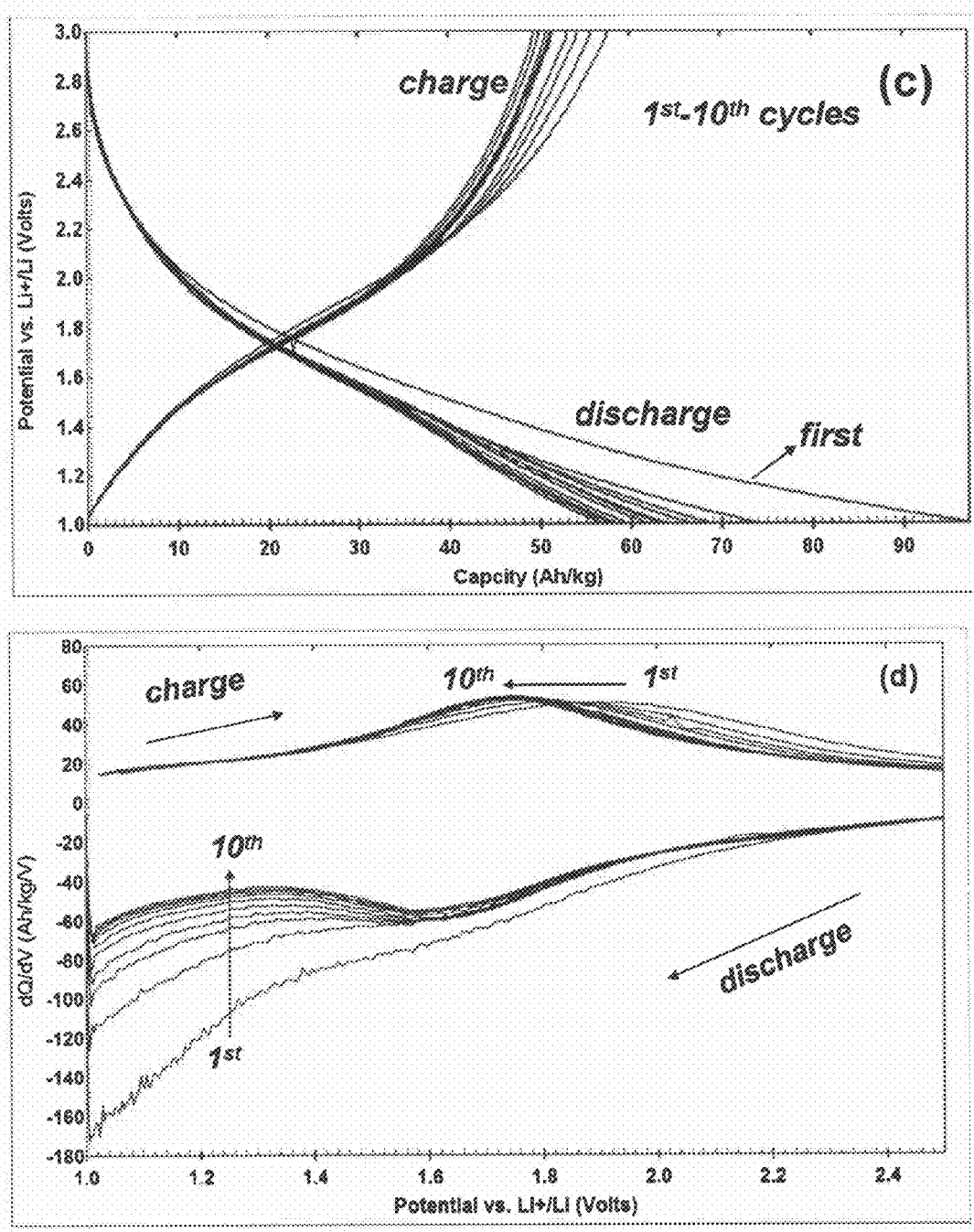
Fig. 11 (c, d))

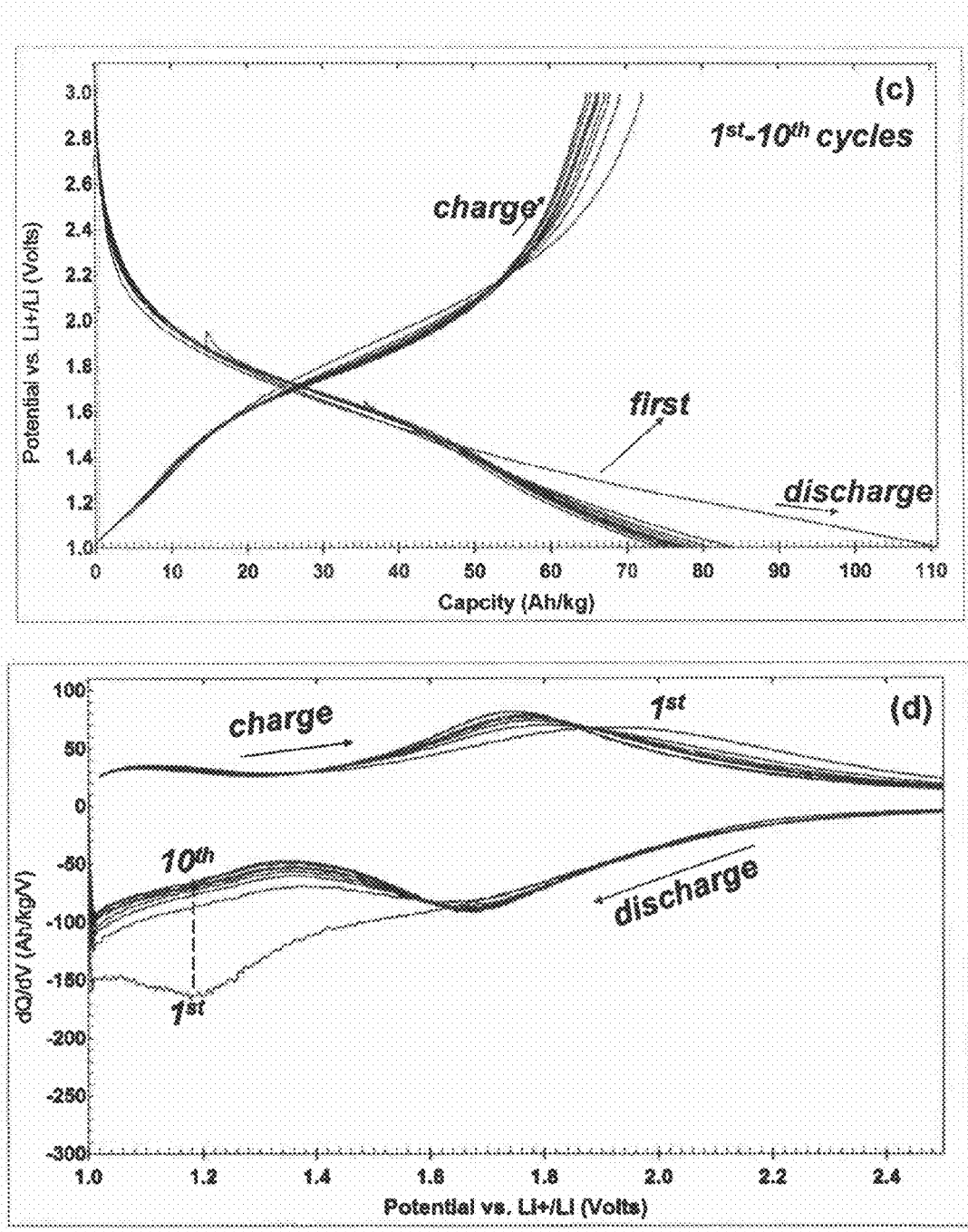
Fig. 12 (c, d)

ELECTRODE COMPRISING A TRANSITION METAL OXIDENITRIDE OR A NITROGEN-DOPED TRANSITION METAL OXIDE AS ELECTRONICALLY ACTIVE MATERIAL

TECHNICAL FIELD

The present invention regards oxidenitrides and nitrogen-doped oxides as electrode material in lithium ion batteries, in particular oxidenitrides and nitrogen-doped oxides with transition metals in high oxidation state. The present invention also relates to a method for manufacturing efficient battery materials.

BACKGROUND ART

Nowadays, it is becoming a consensus that to utilize Li-ion batteries as energy storage is one of the best substitutes for limited, polluted and $CO_2$-producing fossil fuels. Even though intensive research on Li-ion batteries has lasted a couple of decades, the development of electrode materials with high energy capacities still remains a big challenge.[1-2] It is widely known today that one large family of compounds used as electrodes for Li-ion batteries are transition metal oxides and multi-metal oxides. This includes not only materials for cathodes such as $LiMO_2$ (M=Mn, Co, and Ni), $LiCoO_2$ has a theoretical capacity of 274 mAh/g. but also for anodes like $Fe_3O_4$, CuO among others.[3-5] A new class of compounds that was explored as an alternative to oxides is obtained by introducing large polyanions of the form $(XO_4)^{y-}$ (X=S,P,Si,As,Mo,W) into the lattice. An inductive effect of $(PO_4)^{3-}$ and $(SO_4)^{2-}$ ions raises the redox energies compared to those in oxides and also stabilizes the structure. For example, $LiFePO_4$ has become a highly suitable electrode material due to its low price, high durability, and easy synthesis. It can reversibly intercalate Lithium at a high voltage (3.5 V) and has a good gravimetric capacity (170 mAh/g) which is an important attribute to produce a cell with a high energy density. Its analogues, for example $LiMnPO_4$, are also good candidates for electrode materials (more specifically for positive electrode materials). Silicates of similar composition and crystal structure have also been considered for positive electrode materials. Most of the silicates investigated are of the form $Li_2MSiO_4$ where $M^{2+}$ is a transition metal. $Li_2FeSiO_4$ may become another promising electrode material. But compared to $LiFePO_4$, it has a lower electronic conductivity and a lower electrode potential[2].

However, oxides and phosphates both have poor electronic and Li-ion conductivities, which can restrain the charge/discharge speed, as well as the cycling stability of such batteries. Enhancement of electronic and Li-ion conductivities is the key for improvement. Coating the particles of electrode material with conductors such as carbon or conductive polymers can lead to an improvement, especially in the case of a compound with such low conductivity. PPy coating improves the conductivity of $LiFePO_4$ and increases the specific surface area of electrodes, PPy/PEG coating allows for easier access of ions and electrons to deeper lying $LiFePO_4$ structure and improved electrochemical activity and charge-transfer reaction of cathodes[39]. A high increase of electrochemical performance was achieved for materials prepared with amorphous carbon coatings. However, adding large amounts of low density non-active materials like carbon or polymers to the active material, unfortunately results in a lowering of both volumetric and specific energy densities. Finally, doping with different additional cations is also considered to be an effective method. $LiFePO_4$, for example, becomes a promising cathode material when cation-doping is used to make it a good conductor of both electrons and Li-ions. For instance, a Ni doped $LiFePO_4$/C nanocomposite exhibits excellent electrochemical performance[40]. Improvements in reversible capacity have also been achieved when the iron phosphate was doped with Mg. This has been attributed to an improvement in electronic conductivity within the active material particles[41]. However, in the more general case, large series of optimization experiments are still needed in order to determine the proper types of cations and the proper concentrations.

Besides, another type of electrode materials, more specifically relevant to anodes, comprises transition metal nitrides, which include lithium insertion compounds, like e.g. $Li_3FeN_2$, $Li_{3-x}M_xN$ (M=Co, Ni, Cu), $Li_7MnN_4$, as well as lithium free compounds, like e.g. CoN, $Cr_{1-x}Fe_xN$.[6-12] Usually, nitrides have low work potentials because of the feature of covalent (or metallic) bonding between transition metal and nitrogen. However, recently it was realized that, in carbonate-based electrolyte batteries, anodes with a low work potential (<1V) could destroy the solid electrolyte interface (SEI) and thereby trigger short-circuits and electrolyte ignition during fast charge. These unwanted properties provide a strong motivation to search new anodic substitutes for graphite and nitride-like anode.[1] To develop safe and long-life batteries, $TiO_2$ and $Li_4Ti_5O_{12}$ attracted more attentions and were investigated intensively for applicable anodes.[13-14] $Li_4Ti_5O_{12}$ showed a practical capacity as high as 200 Ah/kg and a proper potential plateau at 1.5V vs. $Li^+/Li^0$ resulting from the $Ti^{4+}/Ti^{3+}$ redox couple.[3] Also, the $Nb^{5+}/Nb^{4+}$ couple had a potential around 1.5V vs. $Li^+/Li^0$ in niobates, and the further reduction to a $Nb^{4+}/Nb^{3+}$ couple may further increase the lithiation capacity of compounds. For examples, $Nb_2O_5$ and various niobates like $AlNbO_4$, $KNb_5O_{13}$ and $K_6Nb_{10.8}O_{30}$ exhibited outstanding electrochemical properties as anodes of Li-ion batteries.[15-18]

Recently, studies have been started to probe transition metal oxidenitrides within various applications such as ionic conductivity, catalysis, pigment and thermoelectric.[19-21] However, only a few of them were investigated as electrodes in Li-ion batteries. The first case that indeed a transition metal oxidenitride was used as an electrodes in Li-ion batteries was $Li_{7.9}MnN_{3.2}O_{1.6}$, which exhibited a similar electrochemical behavior as $Li_7MnN_4$ but shows an improved chemical stability.[22-23] It must be realized that, in principle, transition metal oxidenitrides are supposed to have higher theoretical capacity than the corresponding oxides because of their higher lithiation ability per unit weight. Unfortunately, the number of transition metal oxidenitride is quite limited due to the restricted ceramics sinter synthesis methods and difficult determination of N/O in structure. Up to now, the electrochemical investigation of transition metal oxidenitrides has mostly been focused on IVB, VB and VIB metals.[24-25]

TaNO was documented in 1966 by Brauer for the first time and studied as new pigment recently.[26] The oxidenitride anion of vanadium with 5+ oxidation state was discovered by ammonolysis only when Ba existed in structure.[27] In contrast to that, NbNO was not accessible through a simple ammonolysis reaction. In 1977, single crystals of NbNO were grown by reacting $NbOCl_3$ and excess $NH_4Cl$ at 900-1000° C. and used to identify its crystal structure.[28] Also, it was reported that black powder of NbNO could be obtained by decomposition of niobium oxychloride amide. NbNO is iso-structural to TaNO: both compounds have the baddeleyite ($ZrO_2$) structure with monoclinic symmetry (space group $P2_1/c$). As shown in FIG. 1, Nb atoms are surrounded by three oxygen and four nitrogen atoms to form irregular octahedral [$NbO_3N_4$] which are connected by edge-sharing N and corner-sharing O atoms. Electronically, Nb(V) oxidenitride owns semiconductor-like characteristics due to the fully empty d-band of niobium. NbNO has a calculated band gap of 1.7 eV and is supposed to show blue color.[29]

The electrochemical performance of electrodematerials is still a crucial limiting factor for high energy density batteries and an increase of capacity is pivotal. Thus there is a great need for an improved electrode material and an improved rechargeable battery comprising such an electrode material, in particular a battery with high stability over many charging-discharging cycles and/or improved capacity.

DISCLOSURE OF THE INVENTION

Hence, it is a general object of the invention to provide electrodes, i.e. anodes or cathodes, with better capacity compared to the respective oxides.

Further objects are batteries comprising such electrodes and methods for producing such materials and electrodes.

Now, in order to implement these and still further objects of the invention, which will become more readily apparent as the description proceeds, the electrode of the present invention is manifested by the feature that it comprises a conductor and an electrode coating, said electrode coating or electrode material comprising as electronically active material a transition metal (T) oxidenitride of formula $Li_xT'_m T''_nN_yO_z$ in form of nanoparticles, wherein x=0-3, y+z=2-4, y>0, z>=0.25, m+n=1, m=0-1, n=0-1, $T'$ and $T''$ both being transition metals of the groups IVB, VB, VIB and VIIB, or periods 3d, 4d and 5d. Usually $T'$ is a 4d or 5d transition metal, in particular a 4d transition metal and $T''$ is a 3d transition metal. If $T'$ and $T''$ are in their highest oxidation stage, x preferably is 0.

Preferred transition metals are Zr, Nb, Mo, Ti, V, Cr, W, Mn, Ni, Co, Fe and Cu.

In such materials Li may be present in lattice places as substitute for T or intercalated within interstitial sites.

Dependent on the kind of transition metal, its oxidation state and the Li content, such materials may be used as anode materials or as cathode materials, respectively.

Compared with most of the other commonly used electrode oxides, oxidenitrides in general are assumed to have better electronic and ionic conductance due to the larger polarizability of the nitride anion and smaller band gaps. In addition, the nitride anion has higher negative charge than the oxide with simultaneously lower molecular weight, thereby improving the capacity per weight unit.

A common method for obtaining nitrides, oxynitrides and nitrogen-doped compounds is ammolysis[27,35,42]. According to a typical implementation, the method consists in putting a starting material in a horizontal furnace and then heating up it up under a continuous $NH_3$ or $NH_3$ mixed with $N_2$ (or Ar) gas flow. After a few hours, Nitrogen containing samples are obtained. FIG. 14 is a schematic representation of the ammolysis setup. The temperature program has a significant influence on the kind of products that are obtained. Compounds change from oxides, through Nitrogen-doped oxides (maybe other oxides with low valence states), and then oxydenitrides, and finally to nitrides, as the temperature increases. The speed of the NH3 flow also relates to the obtained compounds. By delicately controlling the ammolysis process, oxygen in electrode materials can be partly replaced by nitrogen without destroying the initial crystal structure, and thus, without imposing significant stochiometric tension on the electroactive compounds. It is therefore crucial to use the right reaction conditions with this process.

Preferred starting electrode materials contain oxides of transition metal such as $MoO_3$, $V_2O_5$, $CrO_3$, $WO_3$, $TiO_2$, $MnO_2$, $NiO_2$, $CoO_2$ and their lithium containing oxides. There is no imperative limitation on the size of the particles of the starting electrode material. However, the size of the particles is preferably less than 100 nm in one dimension at least. Furthermore, the starting electrode materials do not necessarily contain only the above mentioned oxides. Indeed, the starting electrode materials can possibly contain, mixed with the above-mentioned oxides, other conductors like carbon black (graphite), nitrides, carbides, sulfides and/or conducting polymers.

As an alternative to using transition metal oxides as starting material, oxidenitrides can also be obtained by first performing nitridation of another type of starting material (for example by ammolysis reaction) followed by selective oxidation. As a first example of this alternative way of obtaining oxidenitrides, oxidenitride of niobium (Nb) was obtained and tested as electrode material in a new anode for Li-ion batteries. As a second example, TaNO was also obtained and tested. This oxidenitride was the first ternary compound obtainable through an ammonolysis method.

In order to improve the production methods for such oxidenitrides, the decomposition reaction of niobium oxychloride amide was studied in detail, including reaction conditions, thermal analyses, crystal structures and microcharacterization of the products. A new LiI assisted synthesis was found to get rid of overly high pressures in the reactors. Instead of NbNO, the final products were determined as $NbN_{0.7(1)}O_{1.3(1)}$, and a number of them were characterized as around 5 nm diameter particles. Furthermore, pure and carbon coated compounds were prepared to study their electrochemical performance in Li-ion batteries, and the cycling mechanism was proposed as well.

The performed investigations further suggest that preferably a nitridation is performed first, i.e. through ammonolysis reaction with e.g. urea, followed by selective oxidation.

In order to improve the weight of such products at least part of the heavier transition metals may be replaced with lighter transition metals of the same of similar maximal charge, i.e. transition metals of period 3d of group IVB, VB, VIB and/or VIIB transition metals, resulting in compounds wherein neither m nor n are 0, such as e.g. m=0.5 and n=0.5.

To enhance the electric performance of the nanoparticles conductive coatings, e.g. carbon and/or graphene coatings or coatings obtained by pyrolysis of various organic precursors, such as e.g. sugars, may be applied to the particles. Such coatings proved suitable for producing cathodes and also anodes that quickly gain the optimal features and retain them over many charging/discharging cycles.

Electrodes with such nanoparticulate materials can be prepared by mixing such nanoparticles with electronically conducting particles such as carbon black and/or graphite and a binder or—in an alternative embodiment—with a nanoparticulate electronically conducting binder, optionally in the presence of further conducting particles such as carbon black and/or graphite, or by applying a pyrolysis reaction performed such that the nanoparticulate EAM is conductively coated and simultaneously bonded.

In one embodiment, the electrodes are formed from a nanocomposite, that is
an open porous material and
electrically conducting.

In this embodiment the electrodes comprising the inventive nanoparticulate electrode material comprise the nanoparticulate electronically active material (EAM) and nanoparticulate electrically conducting binder material (CB) homogeneously distributed. The mean particle sizes of the nanoparticles of the electronically active material and the average particle sizes of the nanoparticulate binder material
both have similar sizes and/or
both are in the range of <500 nm (mean particle size), in particular in the range of 5 to 500 nm, preferably in the range of 5 to 400 nm, more preferred in the range of 20 to 100 nm.

The electrodes may optionally and preferably comprise additional conductive particles such as carbon black and/or graphite.

Similar particle sizes have proved to be important. The carbon coated particles in a nanocomposite electrode material as described herein behave superiorly to known material. Without wanting to be bound by any theory this might be due to the nanoparticles being covered by fine nanoparticulate electrically conducting binder material and fine nano-sized carbon that make the electrical contact much better with the current collector and among the particles. This is not possible with "large", micron sized electrically conducting fillers such as micron sized graphite flakes and/or bigger carbon particles in non conducting binder matrix, which lead to poor capacity retention.

Similar size means differing not more than 100%, preferably not more than 50%, more preferred differing not more than 20%.

The electrode coatings preferably are open porous materials. An open porous material means that the pores are so large and so interconnected that electrolyte and $Li^+$-diffusion is easily possible.

The nanocomposite electrode comprises the EAM and the CB nanoparticles intimately mixed with each other and preferably stabilized either due to sufficient stickiness of the binder at mixing, storage and usage temperature or by a pressure treatment with or without heating. A thermoplastic material with low glass transition point of the conductive binder is preferred not only for binding the particles but also for binding the nanocomposite to the conductor, usually an aluminum electrode/substrate.

Electrically conductive polymers encompass polyacetylene, polyaniline, polypyrrol and polythiophen. These polymers can be substituted or unsubstituted dependent on the desired features. A presently preferred binder is poly(3,4-ethylenedioxythiophene) referred to below as PEDOT. This polymer is conductive, has suitable stickiness and can readily be produced in nanoparticular form.

In a specific embodiment, the CB nanoparticles are present in an amount of 4 to 10% based on the weight of the nanocomposite.

As already mentioned above, in case that the EAM particles are of an insulating material or in order to improve their conductivity, the nanoparticles are coated with a conductive layer, in particular with a carbon or graphite or graphene layer.

In an alternative battery, the nanoparticulate cathode material and/or the nanoparticulate anode material may be bonded by a pyrolyzed layer that simultaneously acts as conductive coating and as binder. Such pyrolysis may be performed in that the EAM, a pyrolysis precursor such as a sugar, and a soluble lithium source are suspended or dissolved in a suitable solvent such as e.g. water and/or alcohols. The solvents are evaporated at mild conditions and then the dried product is pyrolized at temperatures of 250 to 700° C., in particular 400-600° C.

This method may analogeously be applied for producing conductively coated nanoparticulate EAM that are bonded by other methods.

The good behavior of such electrodes is assumed to be due to the nanoparticulate EAM being coated with a lithium ion conducting coating comprising primarily carbon but also oxygen, lithium and hydrogen.

Nanoparticulate electrically conductive polymers such as Poly (3,4-ethylenedioxythiophene) (PEDOT) may be prepared using the reverse microemulsion technique as described by Sun et al.[38]. In the case of PEDOT synthesis, a microemulsion is prepared comprising emulsified oxidant comprising particles/droplets such as $FeCl_3$/bis(2-ethylhexyl)sulfosuccinate particles as polymerization aid.

For forming the nanocomposite electrode, the nanoparticulate CB is preferably suspended in a suitable solvent such as acetonitril, and the nanoparticulate, carbon coated EAM is then added and the mixture homogenized, dried and optionally pressed with or without heating. If desired, additionally a conductive nanoparticulate filler such as carbon black may be added.

PEDOT is an attractive candidate as a nanoparticulate conductive polymeric binder. Its advantages are high chemical and environmental stability, easy synthesis in various particle sizes and its stickiness that leads to a good interparticular adhesion and sufficient substrate adhesion upon pressurizing with a pressure of 0.5 to 2 bar or $5 \cdot 10^4$ to $2 \cdot 10^5$ Pa, respectively, at room temperature.

Dependent on the stability desired, heating can be absent since the small particles are sticky due to Van-der-Waals forces.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 5. Rietveld refinement plots of $NbN_{0.7(1)}O_{1.3(1)}$ from:

MODES FOR CARRYING OUT THE INVENTION

The invention is now further described by means of the following three synthetic and analytic examples.

Example 1

Ammolysis of Transition Metal Oxides

Preferred starting electrode materials are $MoO_3$, $V_2O_5$, $CrO_3$, $WO_3$, $TiO_2$, $MnO_2$, $NiO_2$, $CoO_2$, more particularly $MoO_3$. As we mentioned in the background section, $MoO_3$ has been considering a potential electrode material for many years because of its attractive $Mo^{6+}/Mo^{4+}$ redox couple. Capacity of electrodes made of $MoO_3$ nanofibers can reach as high as 350 mAh/g in the first discharge, which is near to the theoretical capacity of $MoO_3$, 380 mAh/g (insertion of 2 $Li^+$ per Mo atom). However, after the first cycle, capacity decreases dramatically. Herein, we further describe the nitrogen doped $MoO_3$ and the influence of doping on electrochemical performance.

1. Synthesis of $MoO_3$ Nanofibers

The synthesis of nanofibers of $MoO_3$ was reported elsewhere[43]. Typical reaction is, gently putting grams of molybdenum powder into 20 ml $H_2O_2$ (30%) to obtain yellowish $MoO_2(OH)(OOH)$ solution in a water-ice bath, loading the solution into a 40 ml Teflon-liner autoclave and heating at 150° C. for 12 hours. Light yellowish powders are washed with dried, collected to use as nitrogen doping experiments. The whole reaction is expressed as following chemical equations:

$$Mo+4H_2O_2 \rightarrow MoO_2(OH)(OOH)+3H_2O \quad (1)$$

$$MoO_2(OH)(OOH) \rightarrow 2MoO_3+2H_2O+O_2 \quad (2)$$

Figure 15:
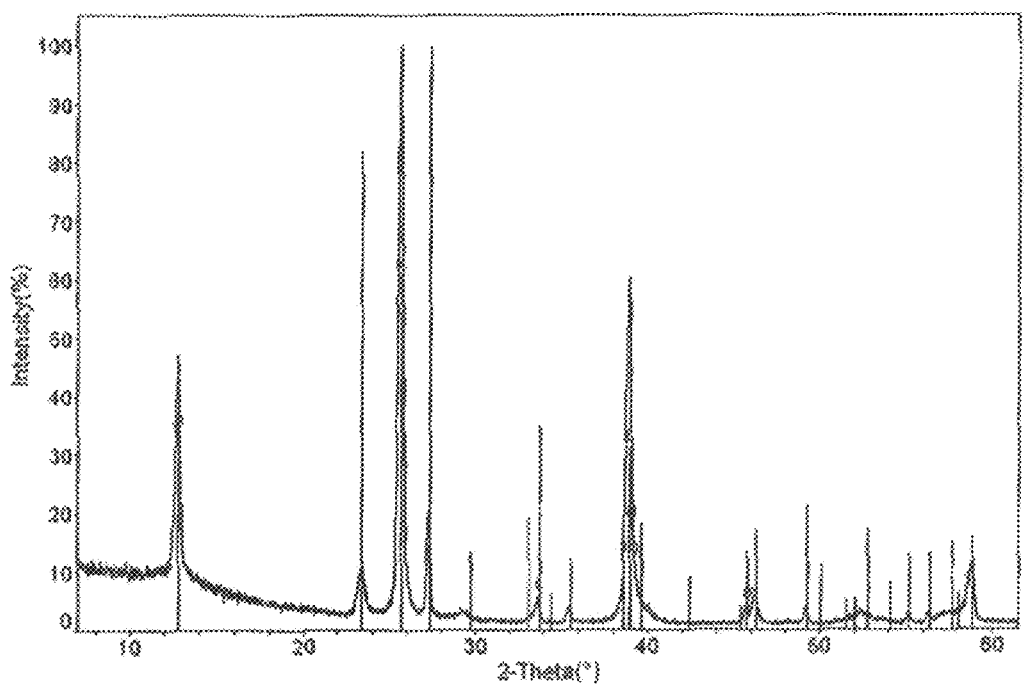
FIG. 15: Powder XRD pattern of $MoO_3$ nanofibers.

Powder X-ray diffraction (PXRD) pattern of obtained samples is showed in FIG. 15. All peaks of obtained sample match with orthorhombic $MoO_3$. Due to the two dimensional nanometric structure, peaks turn out to be wider. The size of $MoO_3$ is 50-200 nanometers in one dimension, thickness is about a few nanometers and the length is in the micrometer scale.

2. Ammolysis of $MoO_3$

Figure 14:
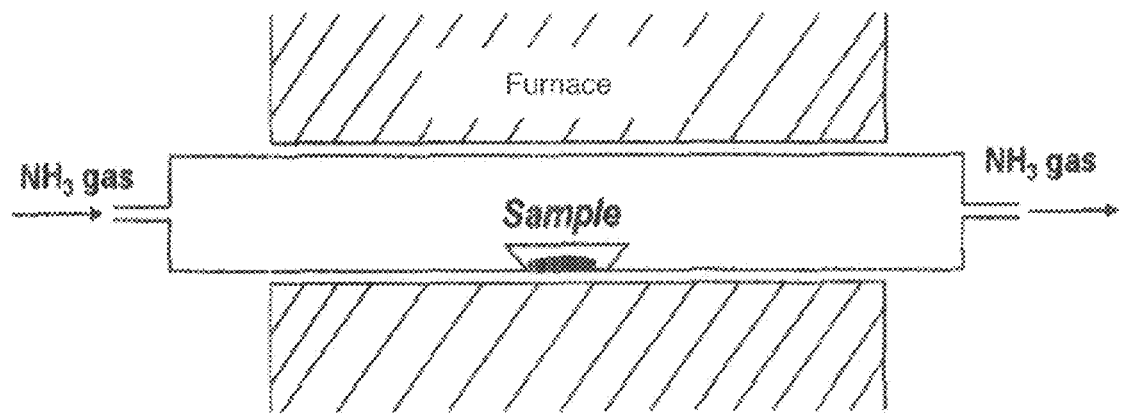
FIG. 14: Schematic representation of an ammolysis setup for producing nitrogen doped compounds.

Loaded the starting materials obtained in example 1, $MoO_3$ nanofibers, into equipment as shown in FIG. 14, and set temperature as 200° C., 300° C. and 400° C., respectively. After 5 hours, color of products was observed changing from light yellowish to deep blue and dark. The number of samples, description and synthesis conditions are listed below (table 1):

TABLE 1 list of samples obtained at different synthesis conditions

| No. | Synthesis conditions | Descriptions |
| --- | --- | --- |
| 1 | Hydrothermal, 150° C., 12 h | Light yellowish, as starting materials |
| 2 | $MoO_3$ + $NH_3$, 200° C., 5 h | Deep blue |
| 3 | $MoO_3$ + $NH_3$, 300° C., 5 h | Dark |
| 4 | $MoO_3$ + $NH_3$, 400° C., 5 h | Dark |

Figure 16:
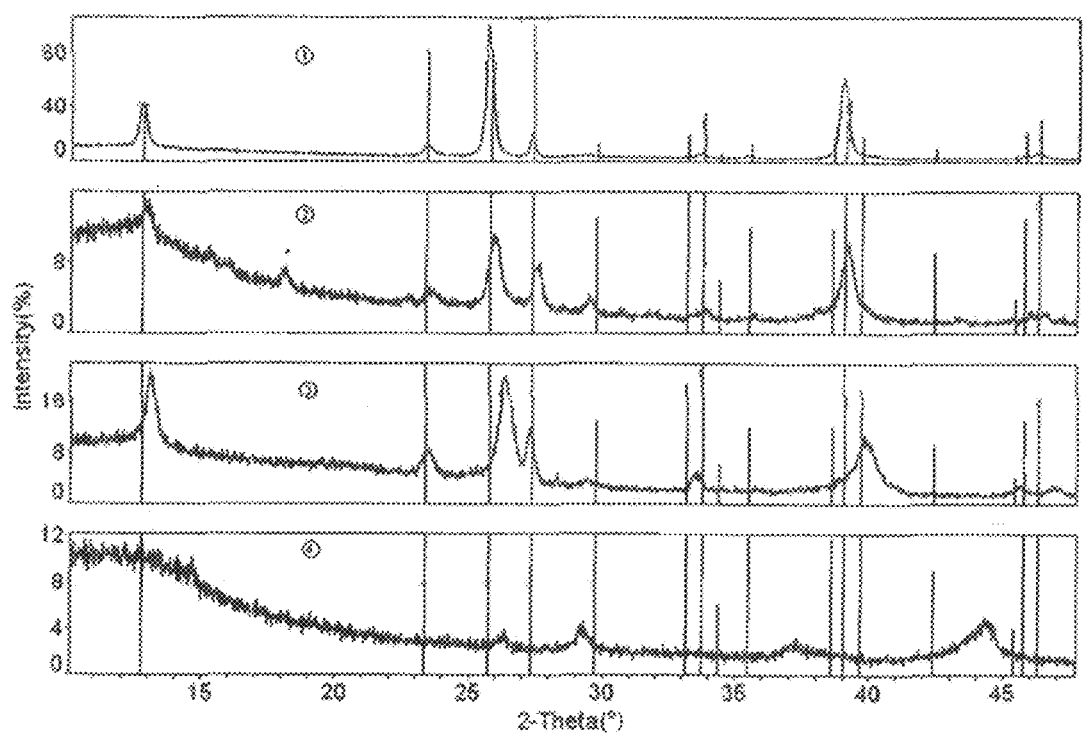
FIGS. 16: Powder XRD patterns of a series of samples obtained by ammolysis at different temperatures.

Powder XRD patterns are presented in FIG. 16. After treatment with $NH_3$ at 200° C. for 5 hours, the stared peak in FIG. 16 indicates unknown impurity produced, and main phase still maintains the structure of starting orthorhombic $MoO_3$. A slight shift of peaks to large angle suggests that the $MoO_3$ is partly reduced from $Mo^{6+}$ to $Mo^{5+}$ and oxygen vacancies shrink the lattice constants. The reaction might be described as follows:

$$MoO_3+(2x/3)NH_3 \rightarrow MoO_{3-x}+xH_2O+(x/3)N_2 (x<1) \quad (3)$$

Peak shifts of sample No. 3 to larger angle turn out to be significant, particularly for the crystal surface (0k0), namely the surfaces are vertical with axis b. As we know, orthorhombic $MoO_3$ is a layered structure staking up along axis a by two-dimensional b-c planet, which is connected with molybdenum-oxygen octahedral by corner sharing[44]. Beside the factor of oxygen vacancies, shrinking of lattice constants in b axis could be partly due to the fact that the Mo—N bond is shorter than Mo—O bond when oxygen is substituted by nitrogen. Furthermore, by using organic element analysis method, about 2% massive nitrogen was detected in this sample. The chemical equation is written down below:

$$MoO_3+[(6-2x)/3]NH_3 \rightarrow MoO_xN_y+(3-x) H_2O+(x/3+y/2-1)N_2 \quad (4)$$

When temperature reached 400° C., $MoO_3$ was completely turned to nitrides. As XRD pattern indicated, the products were mainly poorly crystallized $Mo_2N$. This process can be described by the following equation:

$$2MoO_3+4NH_3 \rightarrow Mo_2N+6H_2O+3/2N_2 \quad (5)$$

3. Electrochemical Measurements
3.1 Assembly of Electrode Materials and Batteries Electrochemical measurement was performed using lithium metal (ribbon 0.75 mm-thick, Aldrich) as reference electrode and Merck Selectipur LP30, which consists of 1 M solution of $LiPF_6$ in a mixture of ethylene carbonate and dimethyl carbonate 1:1 (w/w) as electrolyte. Electrode materials/Super P carbon/PVDF (80:10:10 wt.-%) were ground and then ultrasonically dispersed in N-methyl-2-pyrrolidone (NMP) for 30 min at 40° C. The obtained slurry was printed on titanium current collectors using dropper, and then the solvent was evaporated at 150° C. for 1 h and 120° C. overnight. The typical weight of such electrodes is around 5 mg.

3.2 Galvanostatic Intermittent Titration Technique (GITT)

GITT has been used as a standard method for obtaining chemical diffusion coefficients $D^{GITT}$ of $Li^+$ in Li-ion battery electrode materials. The $D^{GITT}$-coefficients are obtained from the potential response to a small constant current pulse $I_p$ via the formula:

$$D^{GITT} = \frac{4}{\pi\tau}\left(\frac{m_B V_M}{M_B S}\right)^2 \left(\frac{\Delta E_s}{\Delta E_t}\right)^2$$

Figure 17A:
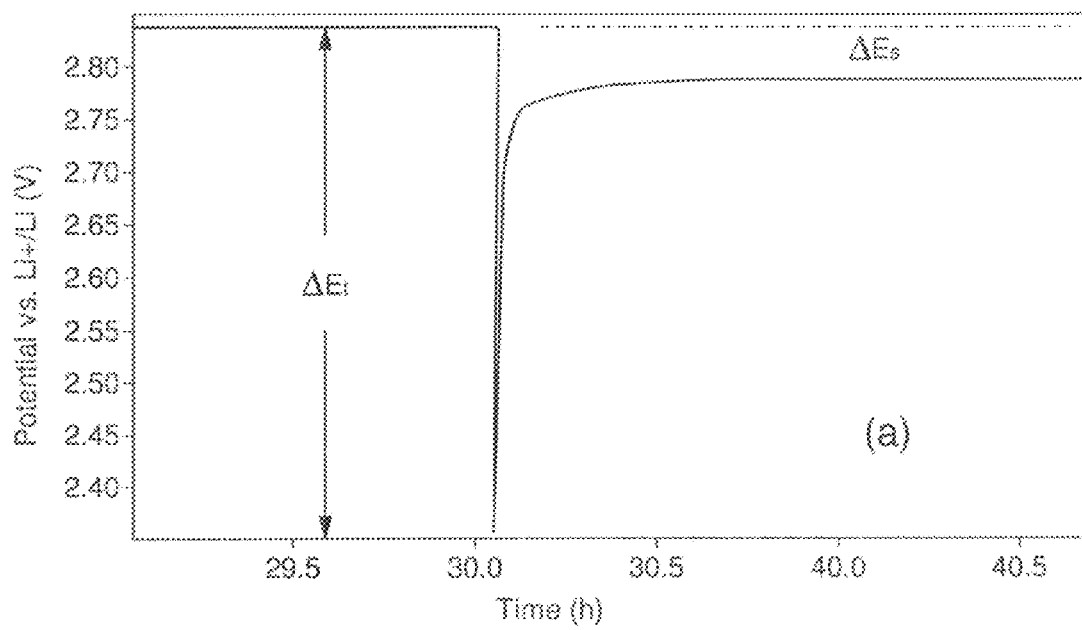
FIG. 17a: Curve of one single current pulse $I_p$ in GITT measurements.

$\tau$ denotes the constant current pulse time, $m_B$ $V_m$, and $M_B$ are the mass, the molar volume, and the molar mass of the insertion electrode material, and S is the area of the electrode-electrolyte interface respectively. As shown in FIG. 17a, $\Delta E_s$ is the change of the steady-state voltage during a single-step GITT experiment, and $\Delta E_t$ is the total change of cell voltage during a constant current pulse $\tau$ of a single-step GITT experiment neglecting the IR-drop[45]. The GITT method allows the evaluation of $D^{GITT}$ as a function of the potential.

Figure 17B:
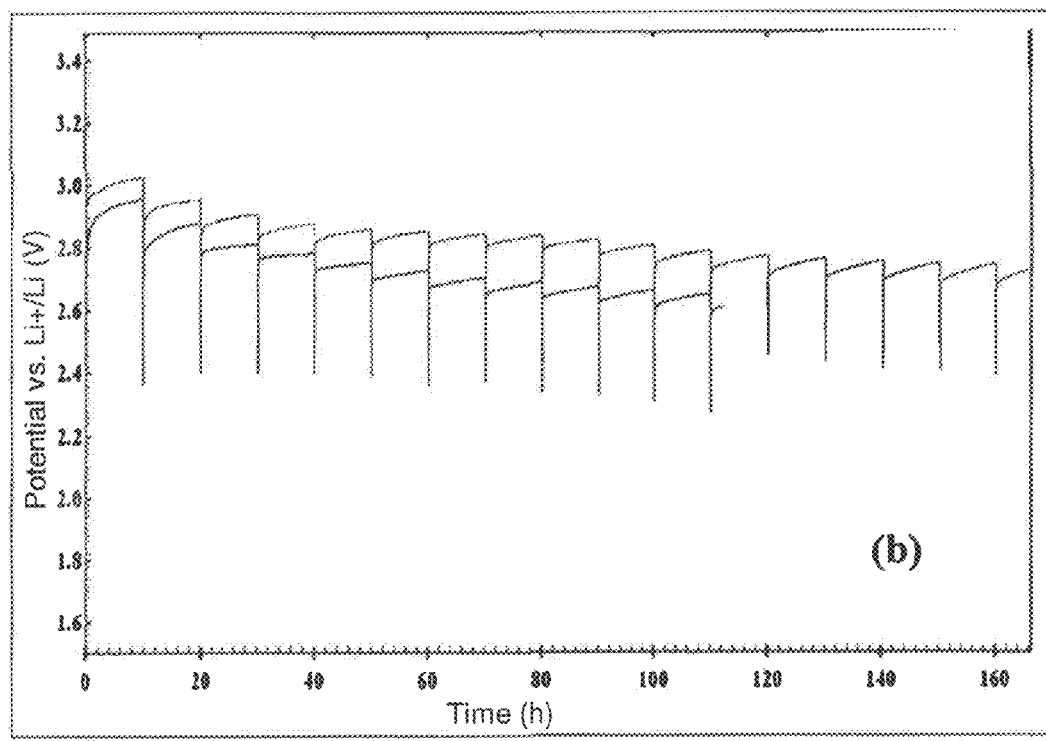
FIG. 17b: GITT measurements of $MoO_3$ (top) and nitrogen doped $MoO_3$ (bottom)

Sample No. 1 and No. 3 were used to perform GITT measurements. During the first discharge, current pulse $I_p$ was given as 300 A/kg until 5 Ah/kg, namely $\tau$ equals to 1 minute, and then stopped the current, kept the cell at open circuit for 10 hours. FIG. 17b presents several periods for these two samples, up side is for sample No. 1 and bottom is for sample No. 3.

Figure 17C:
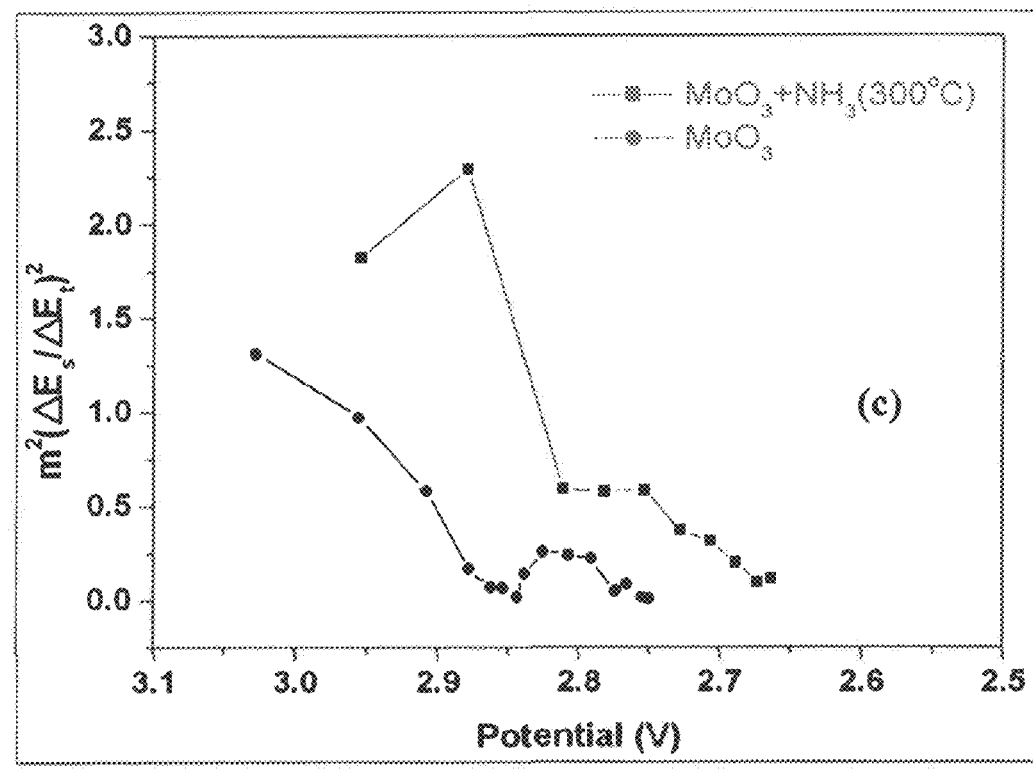
FIG. 17c: Plots of relative quantity of $D^{GITT}$ of $MoO_3$ (square points) and nitrogen doped $MoO_3$ (round points) during the first discharge.

According to the above formula, wiping off the constant factor $4/\tau\pi$, $m_B^2(\Delta E_s/\Delta E_t)^2$ tells us the quantity of lithium ion diffusion coefficient $D^{GITT}$. FIG. 17c plots the functions of coefficient $m_B^2(\Delta E_s/\Delta E_t)^2$ against potential. When potential decreases, insertion of more lithium into structure results in lower lithium diffusion in the material. Comparing the $MoO_3$ and nitrogen doped $MoO_3$ obviously the latter has higher lithium conductivity during the whole discharge process.

3.3 Galvanostatic Cycling Measurements

Figure 18A:
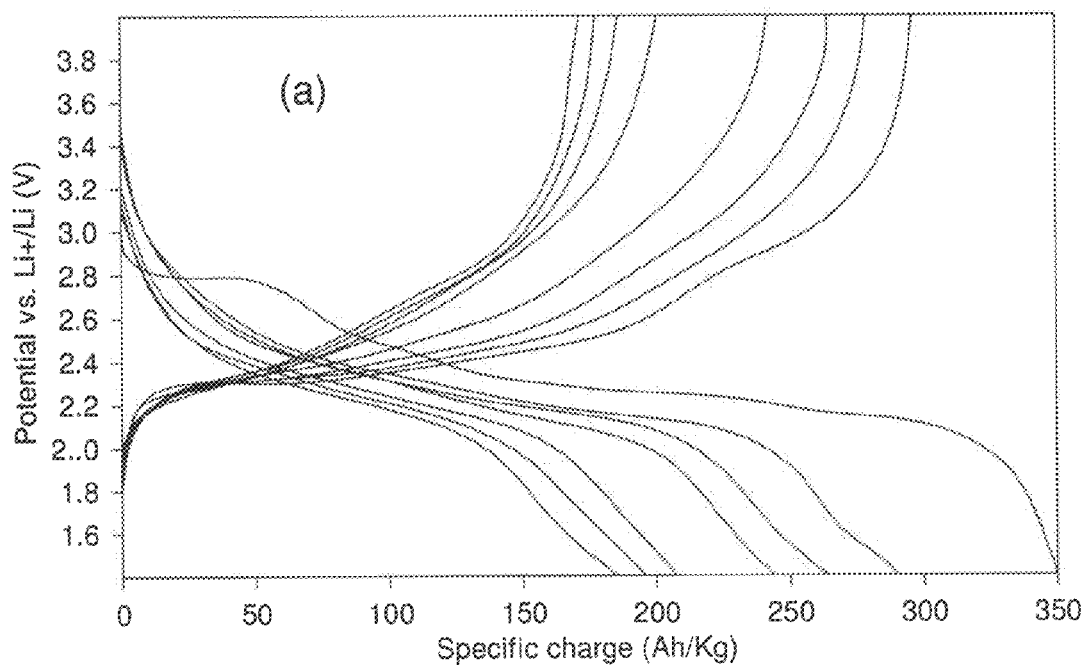
FIG. 18: Galvanostatic cycling curves in first ten cycles for samples No 1, 2 and 3 of Table 1.
Figure 18B:
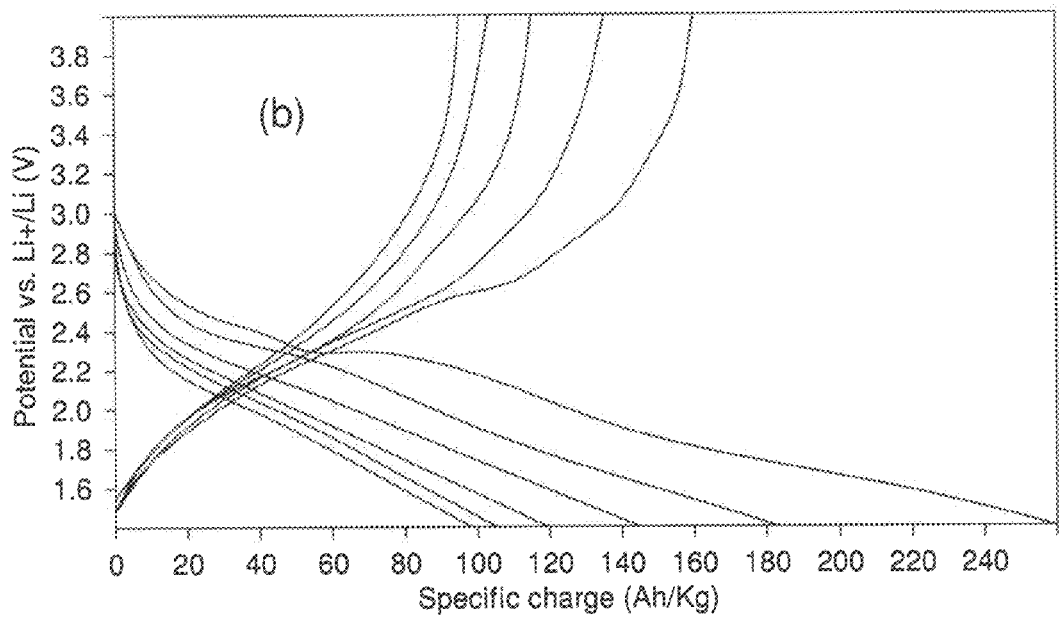
Figure 18C:
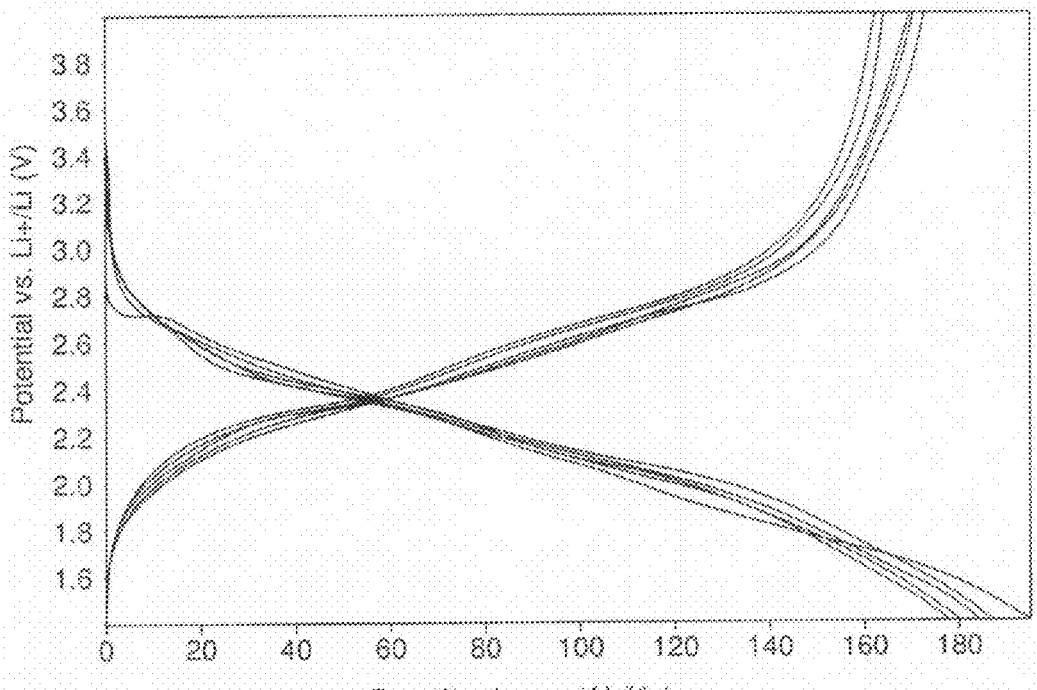

Galvanostatic discharge/charge curves were measured using a current of 30 A/kg. FIG. 18 shows galvanostatic cycling performances of samples No. 1, 2 and 3. In the first discharge, $MoO_3$ has capacity as high as 350 Ah/kg, and then decays dramatically, after 10 cycles, only 170 Ah/kg of capacity is reversible. In FIG. 18b, partly reduced $MoO_3$ has worse cycling performance. However, for nitrogen doped $MoO_3$ (FIG. 18c), although the initial capacity is only 180 Ah/kg, this material has much more stable electrochemical behaviour. We believe that the nitrogen doping helps to stabilize the electrochemical properties since successful substitution of oxygen with nitrogen triggers the insulator-conductor transfer, as well as enhancement of lithium diffusion in the materials.

Example 2

Ammolysis of Lithium Containing Transition Metal Oxides

This nitrogen doping process can also be used in lithium containing compounds successfully. Preferred starting electrode materials are $Li_xMoO_y$, $Li_xV_2O_y$, $Li_xCrO_y$, $Li_xWO_y$, $Li_xTiO_y$, $Li_xMnO_y$, $Li_xNiO_y$, $Li_xCoO_y$, more particularly $Li_2MoO_4$.

1. Nitrogen Doping of Lithium Molybdates

Herein, ammolysis of $Li_2MoO_4$ is taken as an example. The starting material is commercial chemical $Li_2MoO_4$ from Alfa Aesar (99+% purity). Table 2 lists the products obtained from ammolysis of $Li_2MoO_4$ under different temperature programs.

TABLE 2

Temperature programs and products for ammolysis of $Li_2MoO_4$

| No. | Temperature program | Products (from XRD) |
|---|---|---|
| A | 450° C./10 hours | $Li_2MoO_4$ |
| B | 480° C./10 hours | $Li_2MoO_4$ with peak shifts |
| C | 500° C./10 hours | $\gamma$-$Mo_2N$, $Li_2MoO_4$, unknown phase |
| D | 520° C./10 hours | $\gamma$-$Mo_2N$, $Li_2MoO_4$, unknown phase |
| E | 550° C./10 hours | $\gamma$-$Mo_2N$, unknown phase |
| F | 600° C./10 hours | $\gamma$-$Mo_2N$, unknown phase |

Figure 19:
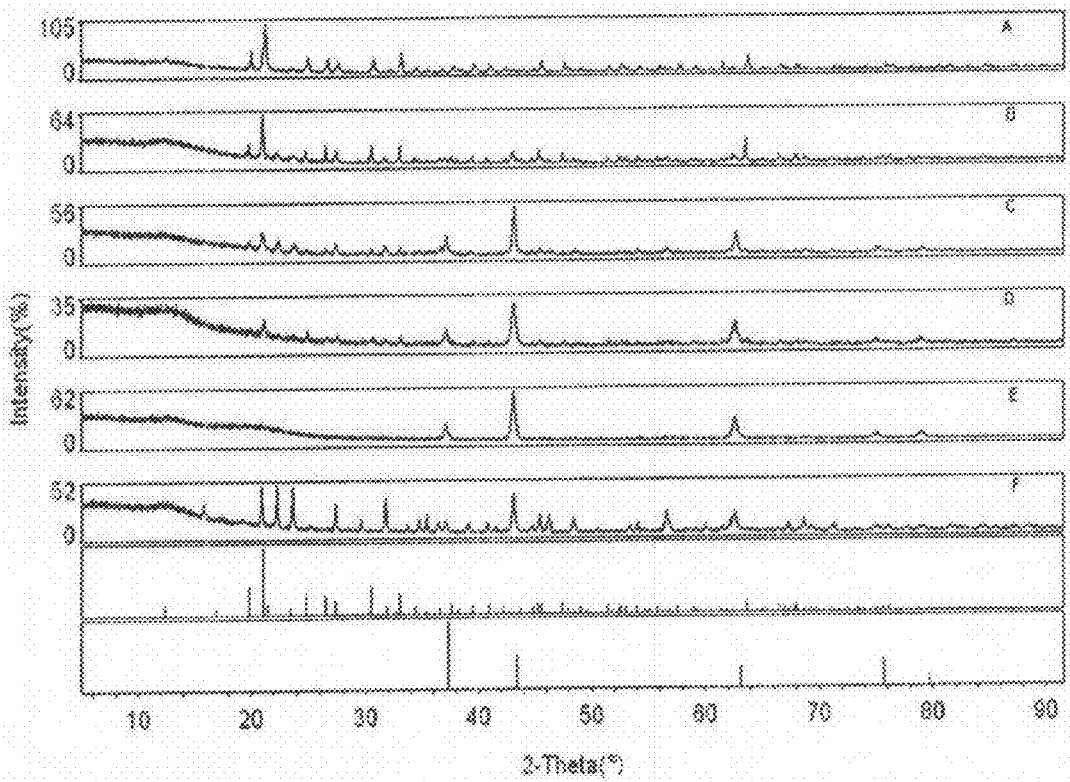
FIG. 19: Powder XRD patterns of products obtained by ammolysis of $Li_2MoO_4$ at different temperature programs.
Figure 20:
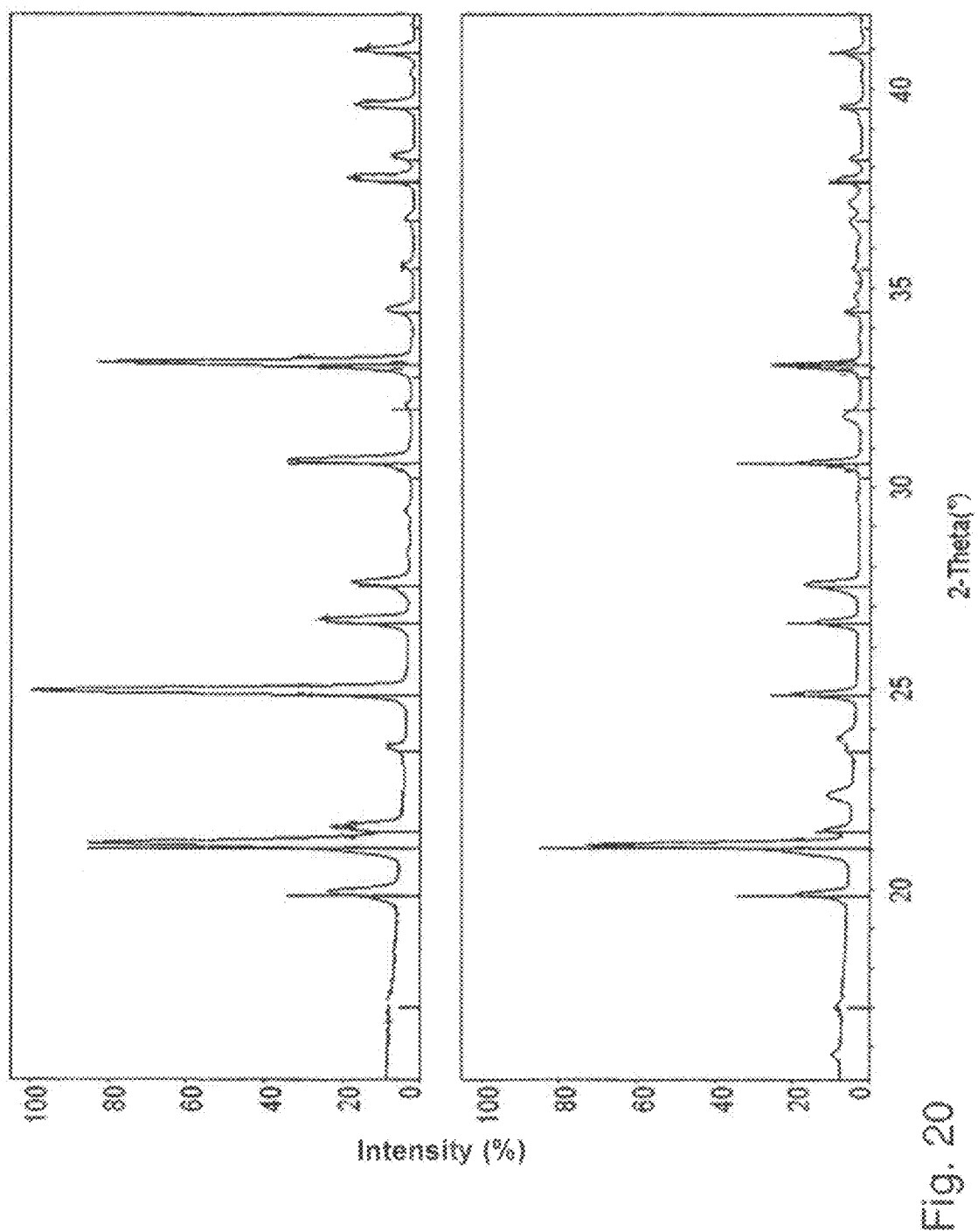
FIG. 20: Comparison of XRD patterns of $Li_2MoO_4$ and of a sample treated with $MH_3$ at 480° C. for 10 hours (sample B).

$Li_2MoO_4$ is water soluble, white color and an insulator compound. After treating with NH3, it turns a dark color and becomes semiconductor (measured in physical properties measurement system). FIG. 19 shows the evolution of powder XRD patterns of commercial $Li_2MoO_4$ and samples A-F. As temperature increases, firstly lattice constants of products start to expand, relative intensity of patterns changes and also some additional peaks appear, as seen in pattern of sample B. These features could explain that nitrogen was doped into $Li_2MoO_4$ successfully. However, further heating could destroy the original structure of $Li_2MoO_4$ and $\gamma$-$Mo_2N$ starts to turn out. In order to clearly illustrate the nitrogen doping phase, FIG. 20 allows to compare the patterns of commercial chemical $Li_2MoO_4$ and of sample B.

Although examples 1 and 2 focus on the case of nitrogen doping on molybdates and their use on rechargeable li-ion batteries, according to the discussion and description, the electrode materials are note restricted only on molybdates, candidates can be any of transition metal compounds, which are working as electrode materials in batteries. By gently controlling of synthesis process, oxygen in electrode materials is replaced by nitrogen partly but without destroying the initial crystal structure when $NH_3$ is employed as nitrogen source.

Example 3

Nitridation Followed by Selective Oxidation 3.1Materials and Methods 3.1.1 Chemicals and Synthesis Methods $NbOCl_3$ was prepared by gas transport reaction. $Nb_2O_5$ (>99%, JMC) and $NbCl_5$ (99.8%, Acros) were mixed in molar ratio 1:3, sealed in Pyrex tube and heated up to 400° C. in 4 hours and keep at this temperature for 40 hours. Deep green needle-shaped crystals of $NbOCl_3$ were produced. These were then ground into a fine white powder and reacted with ammonia at room temperature until the color changed into bright yellowish niobium oxychloride amide $NbOCl_3$ $(NH_3)_x$. To make sure the reaction was carried out completely, a second grinding was necessary. Considering that $NbCl_5$ and $NbOCl_3$ are both water sensitive, the experiments were carried out in a glove box under protective Ar atmosphere.

NbNO was synthesized by decomposition of niobium oxychloride amide. In a typical reaction, 0.8 g NbOCl$_3$(NH$_3$)$_x$ were sealed in a Pyrex tube (8 mm inner diameter and 1 m length) which was put in a vertical tube furnace so that ca. 20 cm of the tube are outside of furnace. The temperature was set to 500° C. for 10-30 h. A black NbNO powder was obtained at the bottom and white NH$_4$Cl separately precipitated at the top of Pyrex tube. When a flux salt was used, typically 0.8 g NbOCl$_3$(NH$_3$)$_x$ and 1.7 g LiI ultra dry, 99%, Alfa Aesar☐were sealed in a long pyrex tube (8 mm inner diameter and 12 cm length) and heated up to 500° C. (heating speed: 100° C./h) and kept at this temperature for 5-40 hours in a Muffin furnace. Then the obtained black bulk was washed with de-ionized water for a couple of times, centrifuged, and dried at 100° C. for 2-3 hours. The final black powder products of NbNO were obtained.

Carbon coated samples were prepared by mixing pure NbNO and 15 weight-% of lactose in a little water and subsequent drying at 100° C. Then, the residue was put in a N$_2$ flow furnace. The temperature was increased to 300° C. very slowly (10° C./h) and then up to 500° C. in one hour, kept at 500° C. for 5 hours and cooled down as the furnace was switched off. 4.6 weight-% of carbon content was detected in the final sample.

3.1.2 Thermal Analysis

Thermal gravimetry (TG) and differential thermal analysis (DTA) were carried on using an instrument of the type Netzsch STA 409 C/CD. 48.1 mg NbOCl$_3$(NH$_3$)$_x$ were loaded in alumina crucible and the measurement was performed in argon atmosphere. Temperature was increased and decreased by 10 K/min from 20° C. to 1400° C. For the synthesis of the NbNO sample, 54.6 mg of the sample were loaded in an open alumina crucible and Ar was implemented. Heating was done from 20° C. to 1450° C. at a rate of 10 K/min.

3.1.3 Diffraction Characterization

Powder X-ray diffraction (XRD) data was collected on a Bruker diffractometer (AXS mod. D8Advance) with Bragg-Brentano geometry, $\lambda_{CuK\alpha 1}$=1.54056 Å radiation (40 mA, 40 kV) and a germanium monochromator. The data for structure refinement were collected at the step of 0.015° in each 10s over the 2 theta range from 15 to 120 degree. Temperature dependent XRD was done at steps of 0.015° in each 0.2s over the 2 theta range from 5 to 90 degree. Heating was done at the rate of 0.5° C./s.

Neutron Powder Diffraction (NPD) data was collected with the PUS two-axis diffractometer at the JEEP-II reactor at Kjeller, Norway. A neutron wave-length of 1.5561 A was used. The step size was 0.05 over the 10 to 135 degree range (2theta). The sample was contained in a vanadium can. Both Rietveld refinements for XRD and NPD were performed with the GSAS software.[30]

3.1.4 Elementary Analysis

Carbon content in lactose treated sample was analyzed in the "Laboratorium für Organische Chemie" (ETH Zurich). The O/N content of the samples was measured by the hotgas-extraction method using a LECO TC500 analyzer at EMPA, (Dübendorf, Switzerland).

3.1.5 Microscopy Analysis

Scanning electron microscopy (SEM) analysis was performed using a Zeiss Gemini 1530 operated at 1 kV. For the measurements of transmission electron microscopy (TEM), the material was deposited onto a holey carbon foil supported on a copper grid. TEM investigations were performed using a CM30ST microscope (FEI; LaB$_6$ cathode) or a Tecnai F30 microscope (both operated at 300 kV, point resolution~2 Å).

3.1.6 Electrochemical Measurements

Electrochemical measurement was performed using lithium metal (ribbon 0.75 mm thick, Aldrich) as reference electrode and Merck Selectipur LP30, which consists of 1 M solution of LiPF$_6$ in a mixture of ethylene carbonate and dimethyl carbonate 1:1 (w/w) as electrolyte. Electrodes of NbNO/Super P carbon/PVDF (80:10:10 wt %) were ground and then ultrasonically dispersed in N-methyl-2-pyrrolidone (NMP) for 30 min at 40° C. The obtained slurry was printed on titanium current collectors using a dropper, and then the solvent was evaporated at 150° C. for 1 h and 100° C. overnight. The typical weight of such electrodes is around 5 mg. Galvanostatic discharge/charge curves were measured using a current of 10 Ah/kg.

3.1.7: Magnetic Measurements

The measurements of magnetism were made using a Quantum Design SQUID (Superconducting Quantum Interference Device) magnetometer MPMS 5S. The applicable field is in the range of +−5T and temperature 1.7-400K. Sample No. 3 (see table 3) was measured in a T-loop, changing temperature from 2K-300K-2K at constant external field at 50, 1000, and 5000 Oe. Firstly sample was cooled down to 2K at zero field (ZFC), then the field was set and measured while warming. Then the temperature decreased to 2K and kept the field at the same level (FC).

3.2 Results and Discussions 3.2.1. Reaction Between NbOCl$_3$ and NH$_3$

Figure 1:
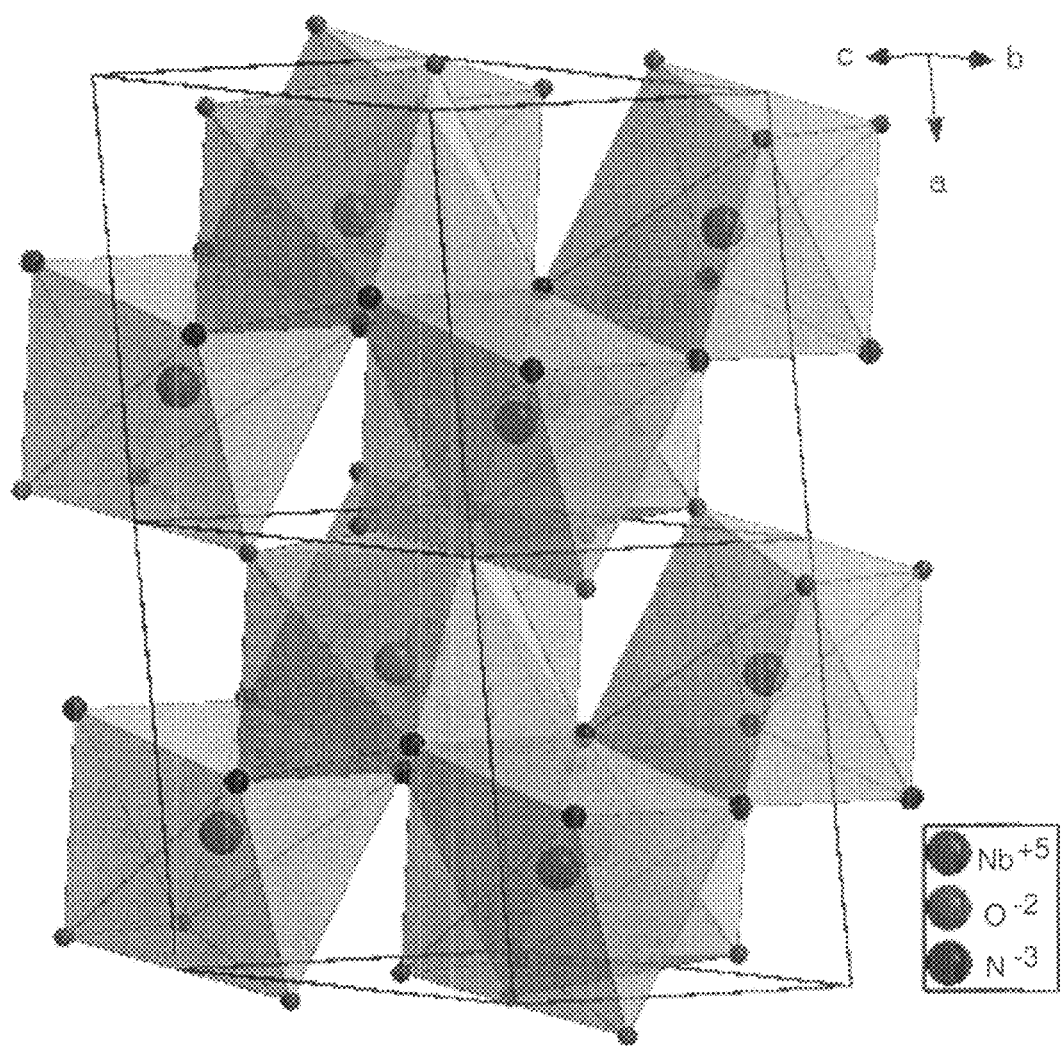
FIG. 1: Crystal structure of NbNO.[28]
Figure 2:
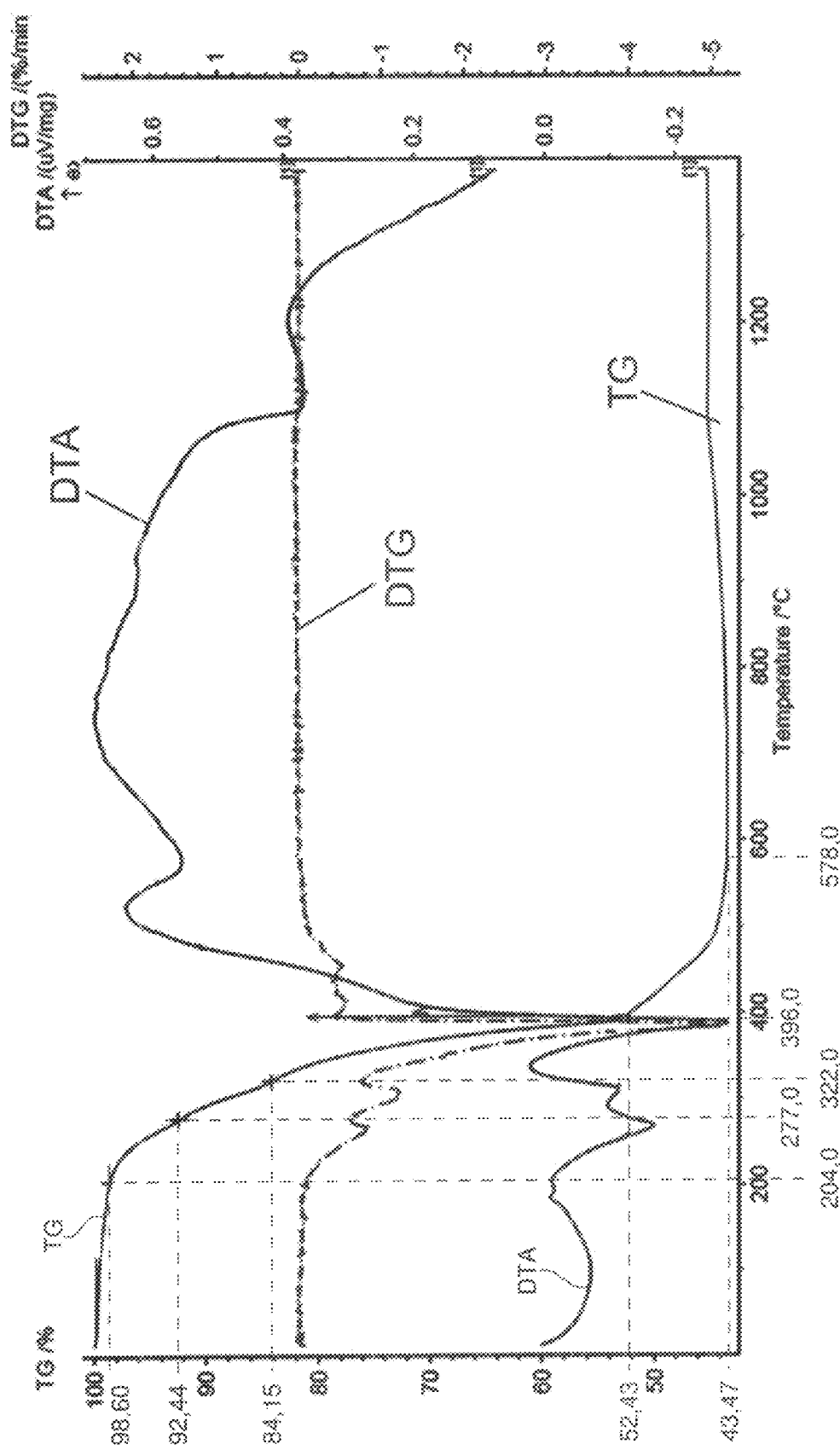
FIG. 2. TG, DTG and DTA curves of $NbOCl_3(NH_3)_x$

Niobium oxychlorite amide NbOCl$_3$(NH$_3$)$_x$ was prepared by ammonolysis of NbOCl$_3$ at room temperature. Thermal analysis curves of this compound (FIG. 2) exhibit that the decomposition of NbOCl$_3$(NH$_3$)$_x$ starts at 200° C. and proceeds violently when temperature reaches 400° C. Meanwhile a quite high amount of heat is releaseed during this reaction. NH$_4$Cl was detected in the decomposition product obtained at 200° C. by XRD. According to the weight loss during the decomposition, the molecular formula of the yellow niobium oxychlorite amine can be calculated as NbOCl$_3$(NH$_3$)$_4$. With respect to the weight of compound, a constant value is reached after this reaction above 500° C. During this part of reaction, as shown in DTA curve of FIG. 2, a few heating emission peaks appear, which may result from thermal property of niobium oxidenitride. Details of this discussion will be presented in the following paragraph about the thermal stability of NbNO.

Figure 3:
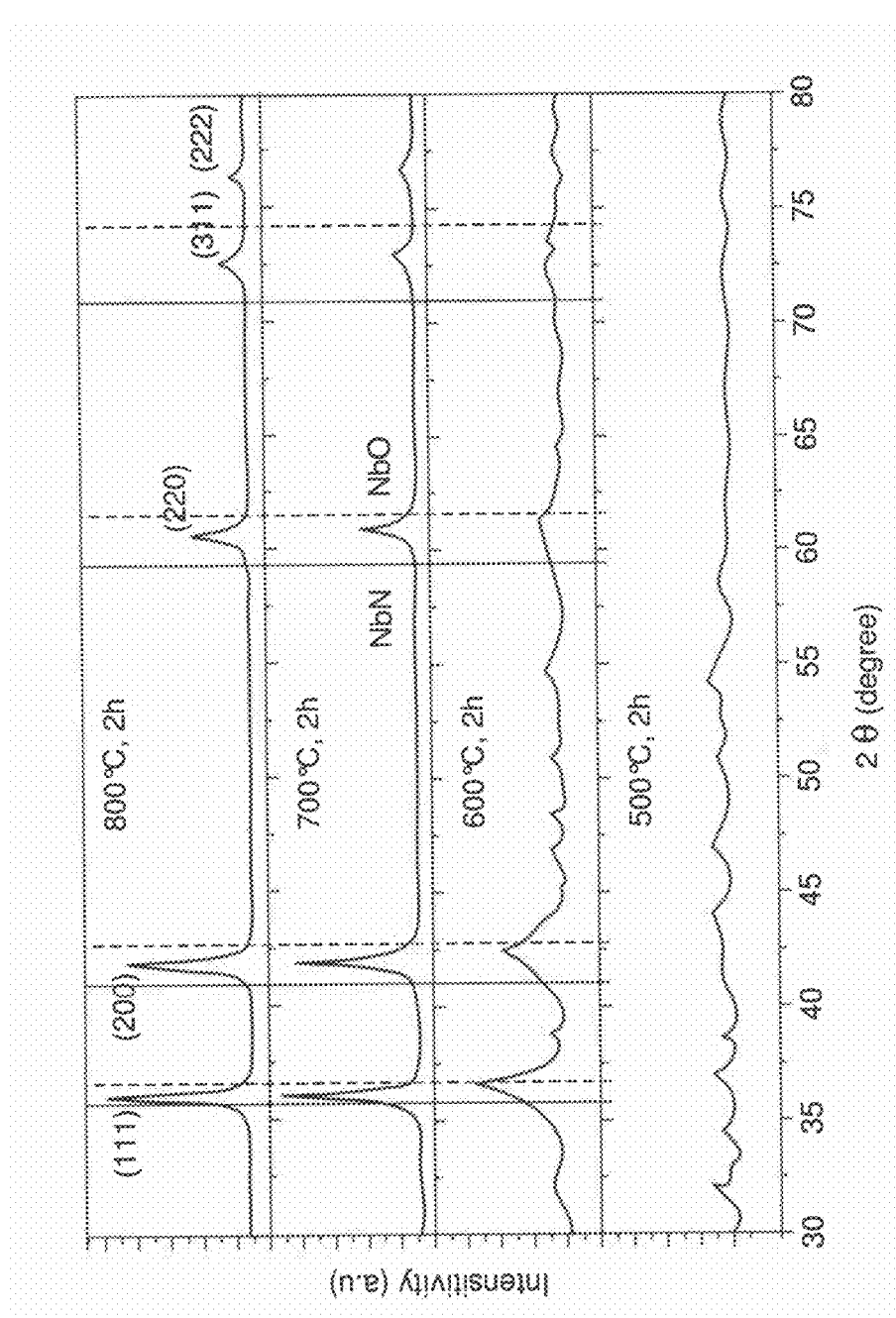
FIG. 3. XRD patterns of products obtained by reaction between $NbOCl_3$ and $NH_3$ at different temperatures, solid and dot straight lines mark the positions of XRD peaks for NbN (PDF # 38-1155) and NbO (PDF # 42-1125), respectively FIG. 4. XRD patterns of different sample (s. Table 3), stars mark the peaks of an impurity that matchs with $LiNbO_3$.

As plotted in FIG. 3, the formation of a rock-salt phase started when the temperature was increased to 500° C. Compared with XRD patterns of the isostructural compounds NbN and NbO, the final products were identified as niobium oxidenitride NbO$_x$N$_y$ (0<x, y<1), which was reported in previous work.[31] Obviously, increasing the temperature results in products with better crystallization and higher nitrogen concentration. The overall reaction process can be described by chemical equations as follows:

$$NbOCl_3 + 4NH_3 = NbOCl_3(NH_3)_4 \tag{1}$$

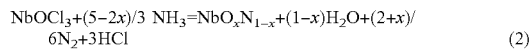

$$NbOCl_3 + (5-2x)/3\ NH_3 = NbO_xN_{1-x} + (1-x)H_2O + (2+x)/6 N_2 + 3HCl \tag{2}$$

Equation 1 is working at room temperature. When the temperature is increased to 500° C., reaction 2 takes place.

3.2.2. Crystallographic Characterization (a) Diffraction Patterns

On basis of the TG and DTA results discussed above, the decomposition process of compound NbOCl$_3$(NH$_3$)$_4$ can simply be described as☐

$$NbOCl_3(NH_3)_4 = NbNO + 3NH_4Cl \tag{3}$$

It must be pointed out that the product NH$_4$Cl would decompose further into NH$_3$ and HCl above 380° C.

As a first attempt for the synthesis, dynamic vacuum and inactive gas protective environments were used to remove NH$_3$ and HCl. Surprisingly, a Nb$_2$O$_5$ phase with back color indicating oxygen deficiency was obtained instead of NbNO. In subsequent attempts it was found that heating the starting chemicals in a closed Pyrex tube could produce NbNO phase successfully. During this reaction, however, high pressure resulting from the formation of NH$_3$ and HCl occurs in closed tubes. In order to get rid of these troublesome disturbing gases, two ways were tried. The first one was to choose reactors big enough so that the built-up inner pressure stayed relatively low. Practically, a long Pyrex tube in a vertical tube furnace was used. NH$_4$Cl decomposed into NH$_3$ and HCl on the hot bottom part of the tube inside the furnace and then the gases combined into NH$_4$Cl and precipitate on the cold top of the tube located outside the heated zone. Five samples prepared in different reaction conditions were investigated (see Table 3). The other strategy was to "absorb" NH$_4$Cl before it started to decompose. Thermodynamically these mixed halides turned to eutectic salts and restrained the decomposition of NH$_4$Cl. At the beginning, the reaction temperature for the direct decomposition of NbOCl$_3$(NH$_3$)$_4$ was optimized. The optimized temperature turned out to be around 500° C. After a careful study of phase diagrams of binary halides, LiI was selected as flux candidate. Li ions preferably combine with Cl$^-$ rather than I$^-$, and the products NH$_4$I and LiCl may become eutectic below 500° C. Such eutectic composition provided a homogenous and soft environment for the reaction. This process can be expressed as the following chemical equation:

$$NbOCl_3(NH_3)_4+3LiI=NbNO+3NH_4I+3LiCl \quad (4)$$

TABLE 3

Reaction conditions of differently prepared samples.

| Reacting conditions | No. 0 | No. 1 | No. 2 | No. 3 | No. 4 |
| --- | --- | --- | --- | --- | --- |
| NbOCl$_3$(NH$_3$)$_4$:LiI (mol) | 1:3 | 1:0 | 1:6 | 1:6 | 1:6 |
| Temperature (° C.) | 500 | 500 | 500 | 500 | 500 |
| Time (hours) | 20 | 20 | 5 | 20 | 40 |

FIG. 4 presents the XRD patterns of the five different samples. It can clearly be seen that excess LiI helps to get rid of LiNbO$_3$ impurities. This could be explained in the following way: Excess LiI can form eutectic mixtures with LiCl/NH$_4$I and works as proper flux to provide homogeneous atmosphere for the reaction. In this case, unlike the direct decomposition reaction of NbOCl$_3$(NH$_3$)$_4$, only few gas is released and an overly high pressure in the reactors can be avoided.

Figures 4A, 4B:
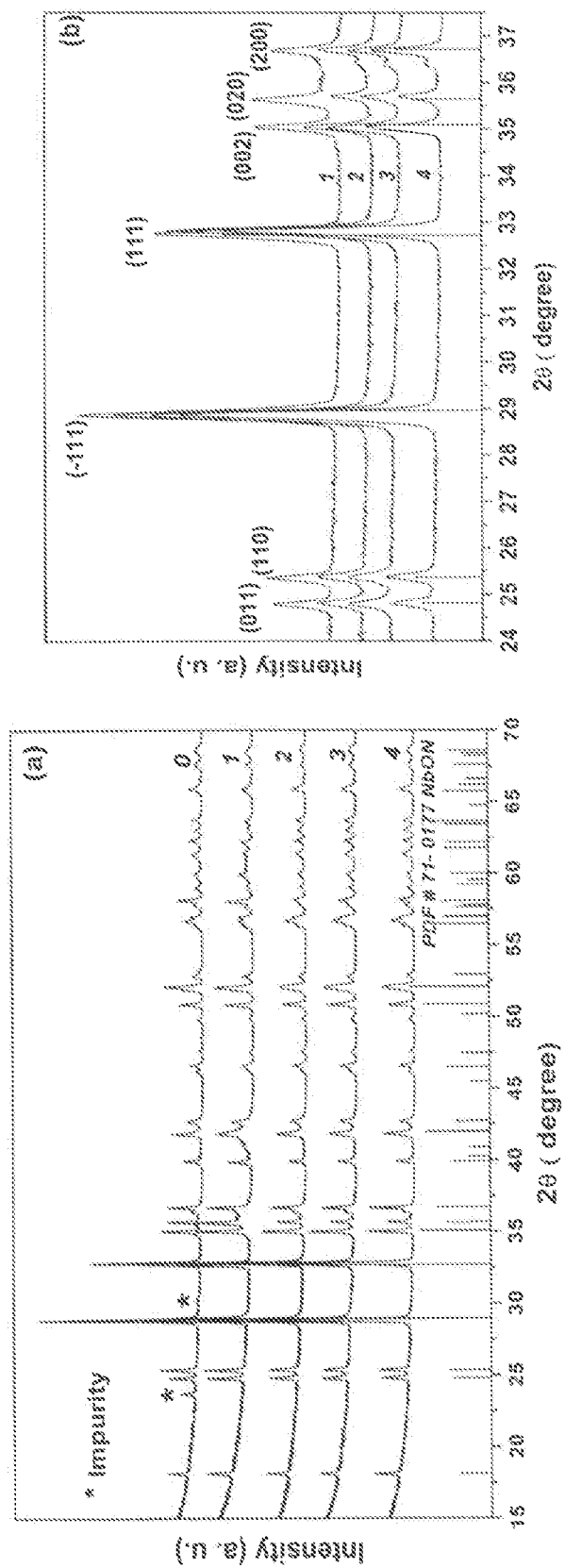
FIG. 4a: Angular range from 15° to 70°.
FIG. 4b: Angular range from 24° to 37.5°.
Figure 5A:
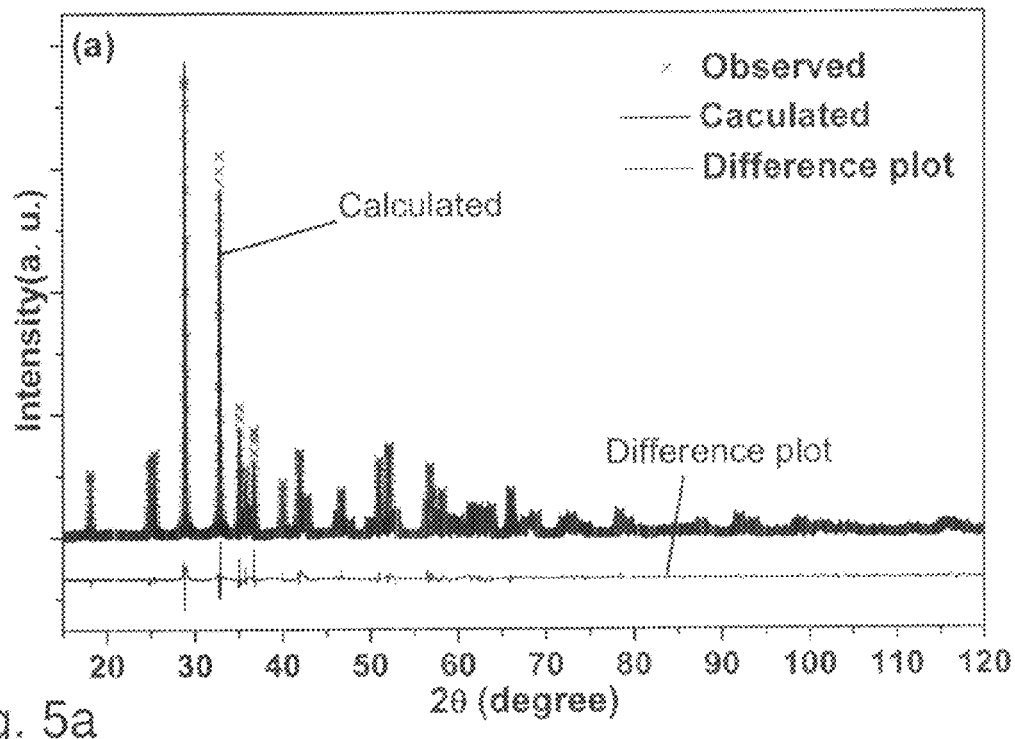
FIG. 5a: XRD data.
Figure 5B:
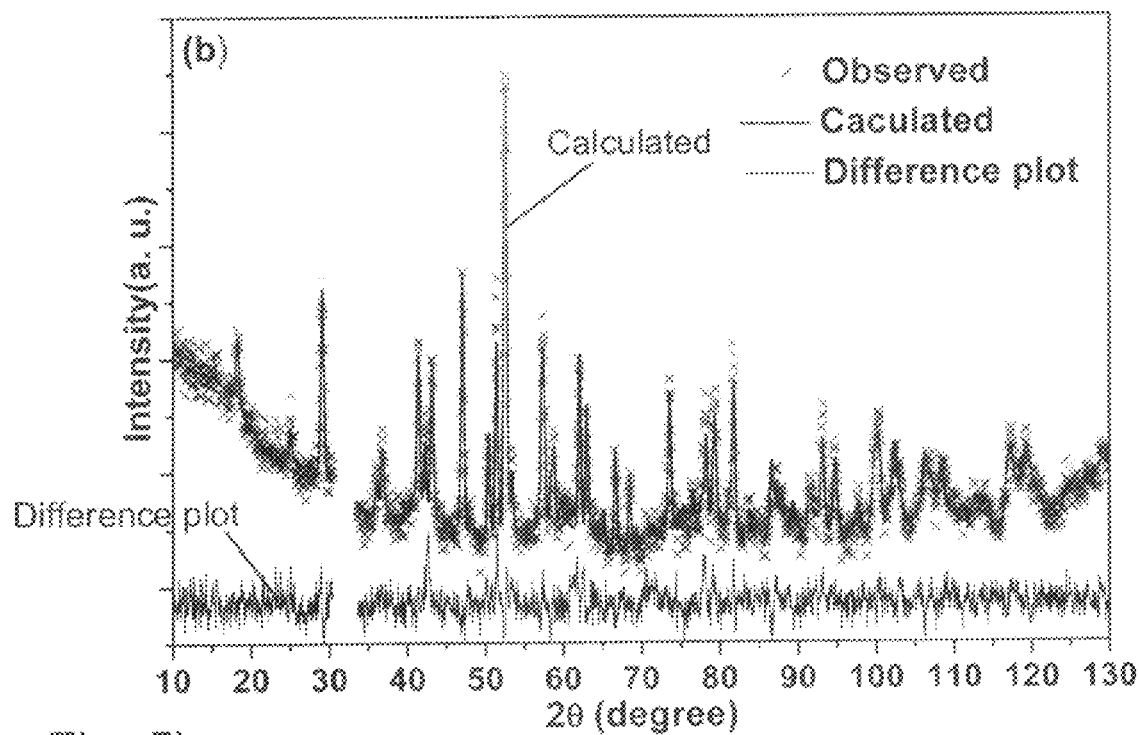
FIG. 5b: neutron diffraction data.

FIG. 4b zooms in the specific diffraction angle range of these XRD patterns. As can be seen, the patterns of the samples obtained here do not match the data collected in 1977.[28] Although both samples obviously have the same monoclinic structure, different phases have been formed. Considering the various possible oxidation states of niobium, the oxygen and nitrogen ratio in the NbNO phase obtained here is likely to be larger than 1:1 with the Nb valence being between +4 and +5. In order to confirm the composition and crystal structure of obtained niobium oxidenitride, element analysis and refinement of crystal structure were carried out.

The composition of the final product was determined as NbN$_{0.7(1)}$O$_{1.3(1)}$ using element analysis. This result is in good agreement with the refinement value of the ratio O/N=0.575 calculated with Fullprof on the basis of the NPD data. This requires a niobium with mixed valency: Nb$^{4.7+}$. The following Rietveld refinements were carried out with a fixed O/N ratio of 1.3/0.7. This value was verified in such a way that 1 of 1.3 O atoms occupy the oxygen positions in the structural model of NbNO from reference[28] whereas the nitrogen positions are occupied by 0.3 O and 0.7 N The comparative results of crystal structure information between ref.[28] and our refinements are summarized in Table 4.

TABLE 4

Refinement results

| Samples | | NbNO[28] | NbN$_{0.7(1)}$O$_{1.3(1)}$ | NbN$_{0.7(1)}$O$_{1.3(1)}$ |
| --- | --- | --- | --- | --- |
| Radiation | | X-ray CuK$_{\alpha1/2}$ | X-ray CuK$_{\alpha1/2}$ | Neutron |
| λ, Å | | 1.5406 | 1.5406 | 1.5561 |
| T, K | | 298 | 298 | 298 |
| SG | | P 1 21/c 1 | P 1 21/c 1 | P 1 21/c 1 |
| a, Å | | 4.970(3) | 4.9770(1) | 4.9803(5) |
| b, Å | | 5.033(3) | 5.0218(1) | 5.0241(6) |
| c, Å | | 5.193(3) | 5.2053(1) | 5.2098(6) |
| β, degree | | 100.23 | 100.755(1) | 100.751(7) |
| V, Å$^3$ | | 127.83 | 127.814(6) | 129.07(3) |
| Z | | 4 | 4 | 4 |
| Nb | x | 0.2911(1) | 0.2882(2) | 0.2881(13) |
| | y | 0.0472(1) | 0.0475(2) | 0.0475(11) |
| | z | 0.2151(1) | 0.2115(2) | 0.2055(12) |
| | U$_{iso}$, Å$^2$ | 0 | 0.011(1) | 0.37(15) |
| | Occ. | 1 | 1 | 1 |
| O1 | x | 0.0636(8) | 0.050(1) | 0.0619(15) |
| | y | 0.3244(8) | 0.327(2) | 0.3256(12) |
| | z | 0.3476(9) | 0.351(2) | 0.3470(13) |
| | U$_{iso}$, Å$^2$ | 0.19 | 0.015(17) | 0.44(13) |
| | Occ. | 1 | 1 | 1 |
| N/O2 | x | 0.4402(8) | 0.438(1) | 0.4354(6) |
| | y | 0.7546(11) | 0.753(1) | 0.7652(6) |
| | z | 0.4782(9) | 0.476(1) | 0.4773(6) |
| | U$_{iso}$, Å$^2$ | 0.03 | 0.015(17) | 0.44(13) |
| | Occ. | 1/0 | 0.7/0.3$^a$ | 0.7/0.3$^a$ |
| Chi$^2$ | | — | 26.81 | 1.303 |
| $^wR_p$ | | — | 0.1295 | 0.0516 |
| R$_p$ | | — | 0.0953 | 0.0393 |

$^a$not refined (b) Electronic Microscopy and Magnetic Behavior

It is well known that fine powders are readily obtained through decomposition reactions of compounds. But at the same time, high temperature conversely drives these particles to stick and fuse together and thus is advantageous for the growth of single crystals.

Figure 6:
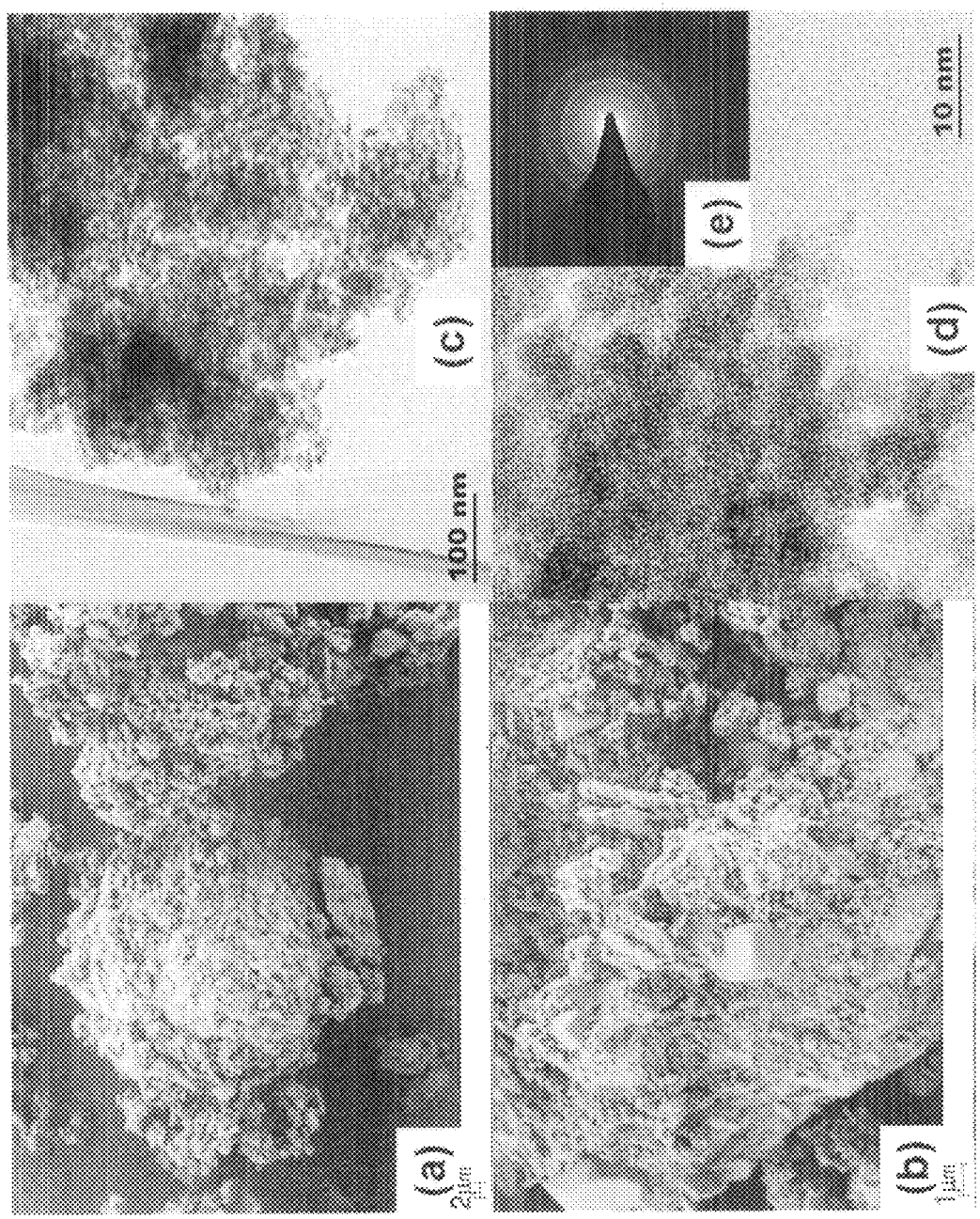
FIG. 6. SEM (a and b), TEM (c and d) and ED (e) of sample No.1
Figure 7:
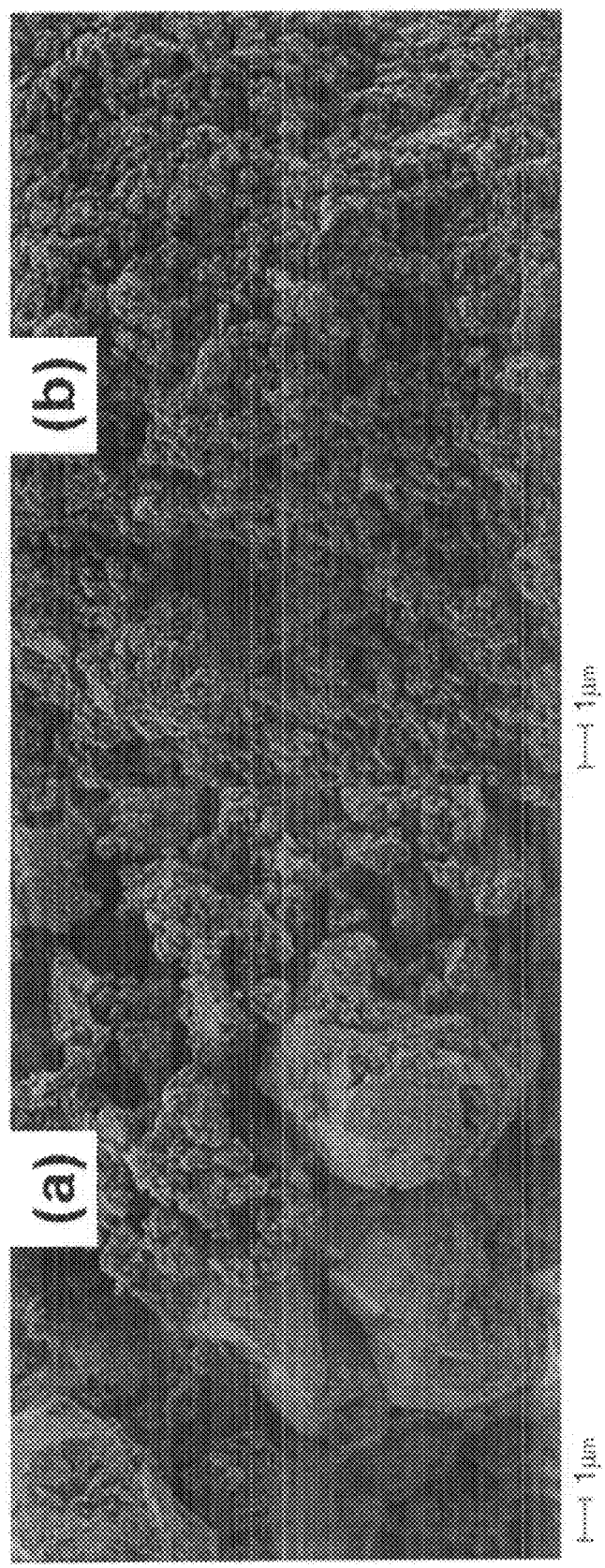
FIG. 7. SEM of samples, (a) pure sample No.3; (b) carbon coated sample No.3.
Figure 8:
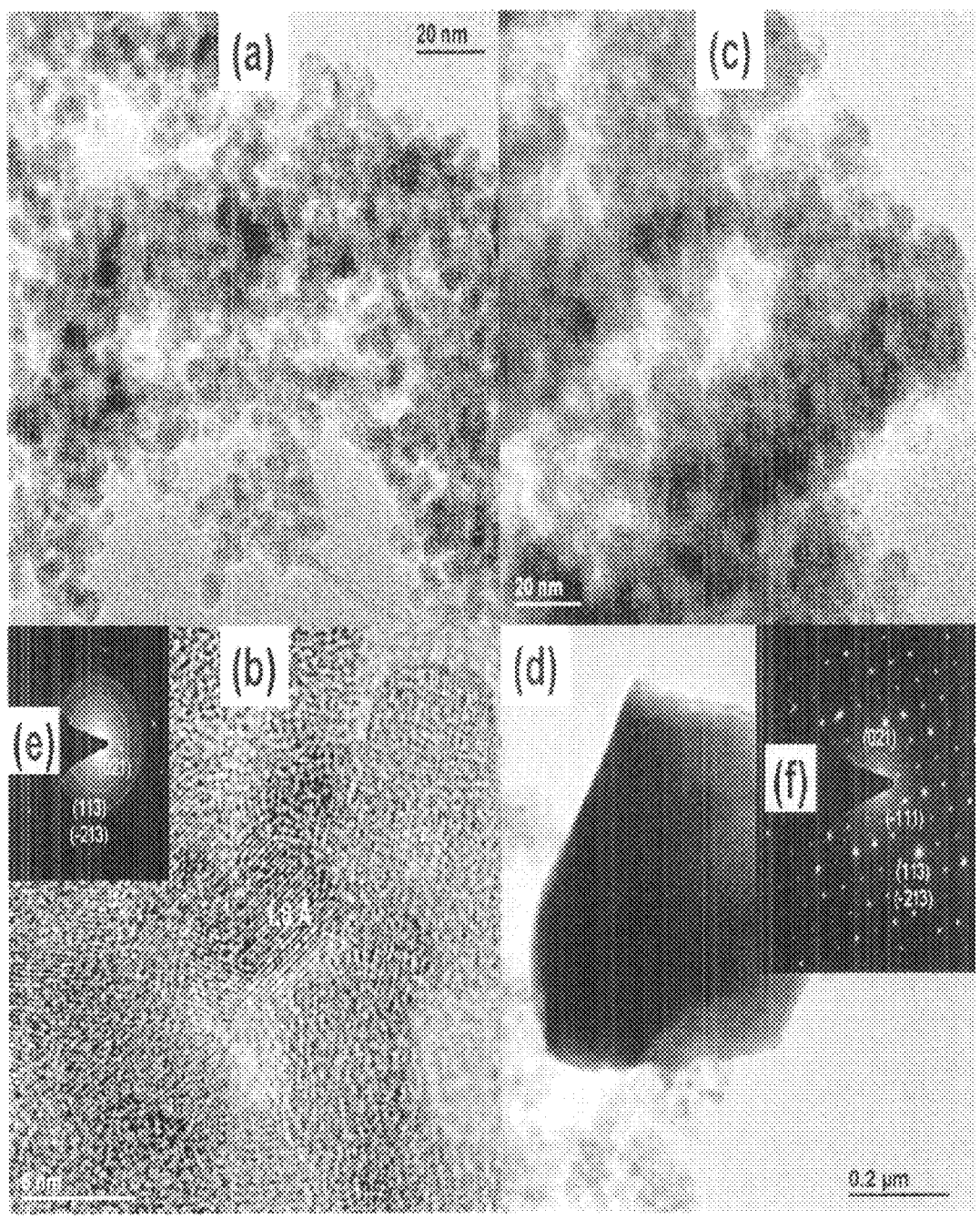
FIG. 8. TEM and ED pictures, (a), (b) and (e) pure sample No.3; (c), (d) and (f) carbon coated sample No.3.

FIGS. 6-8 show the SEM, TEM and ED pictures on pure NbN$_{0.7(1)}$O$_{1.3(1)}$ and lactose treated samples. SEM images (FIGS. 6a-b) reveal micrometric single crystals that are embedded in fine powders, whose particle size is determined as 5-10 nm by TEM images (FIGS. 6c-d, 8a-b). As shown in FIG. 7, it appears clearly that, due to the existence of liquid melted salts, single crystals grow larger when LiI is used as assistant flux. Moreover, it is obvious that the sample is completely covered by carbon when NbN$_{0.7}$O$_{1.3}$ is treated with lactose. Further, TEM FIGS. 8a and c point out this difference between naked and 4.6% by weight of carbon coated samples. By evaluating these TEM pictures it is, however, difficult to differentiate whether the carbon is really coating the original NbNO particles or is just located between them. Remarkably, this addition of carbon indeed effectively improves the electrochemical properties, namely the capacity and the cycling stability (see discussion on cycling curves below). Besides, the results obtained indicate that the nanoparticles and large single crystals both belong to a monoclinic NbNO phase. Firstly, an observable distance between the atomic layers in a nanocrystal (FIG. 7b) of 1.8 Å corresponds to the crystal plane (022) in NbNO. Furthermore, diffraction rings in the electron diffraction patterns indicate a multi-crystalline feature of the selected area that consists of nanometer-sized particles. By indexing the diffraction spots in ED pattern of the large single crystal that is detected in TEM measurement, the phase is identified as monoclinic NbNO (FIGS. 8d and f).

Figure 13:
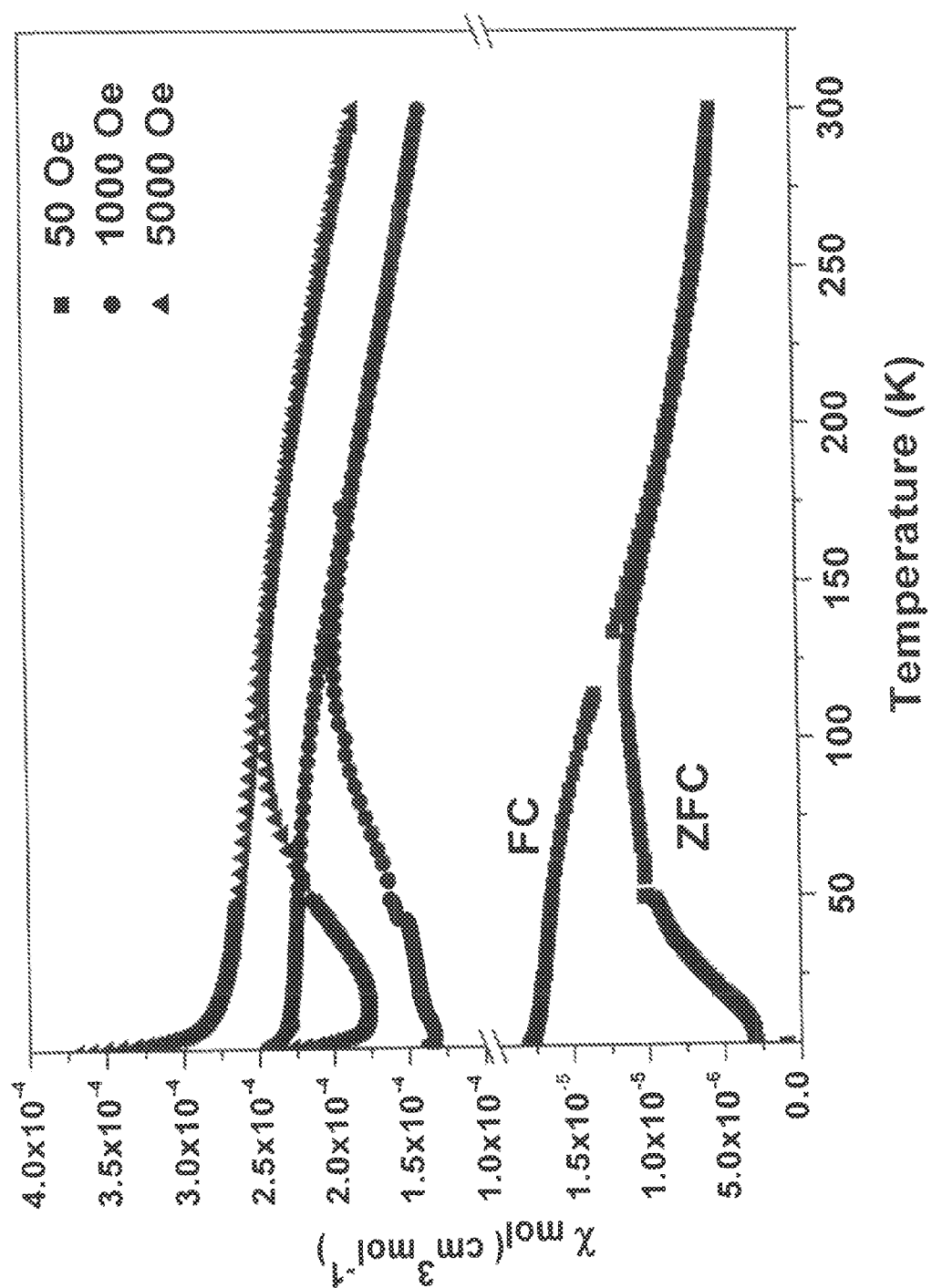
FIG. 13: Temperature dependence of magnetic susceptibility of nanosized $NbN_{0.7(1)}O_{1.3(1)}$ measured under different fields.

It must be emphasized that, due to the oxidation valence +4.7 of niobium in $NbN_{0.7}O_{1.3}$, the compound exhibits superparamagnetism, as depicted in FIG. 13. In fact, this phenomenon usually occurs when inter-particle magnetic interactions are sufficiently weak in an assemble of nanoparticles.[32] This evidence strongly supports the features of nanometric size particles and an unsaturated oxidation state of niobium in these compounds.

3.2.3. Thermal Behavior

Figure 9A:
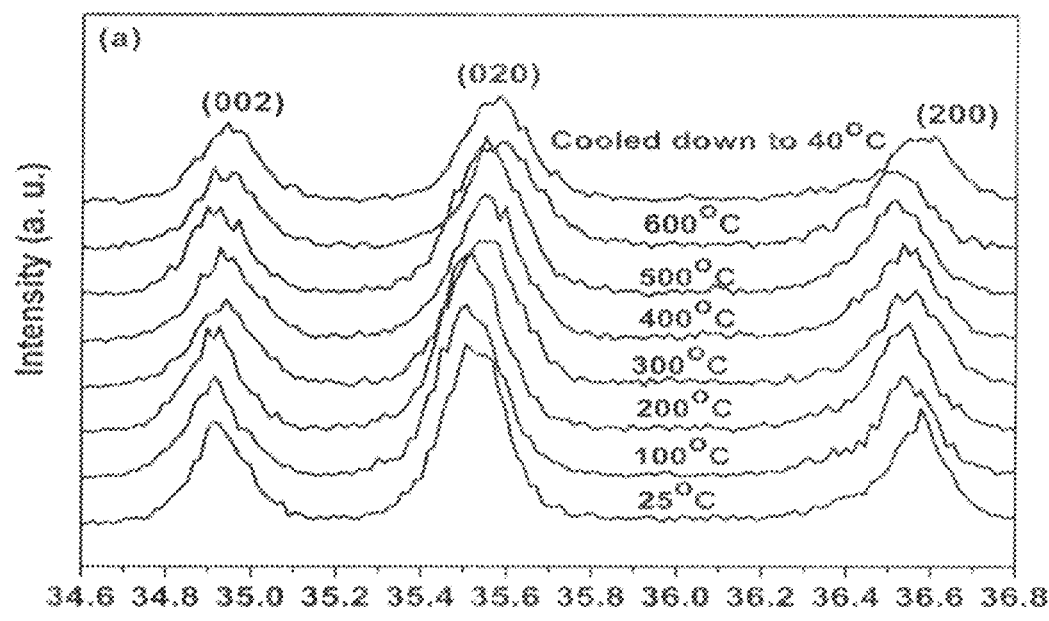
FIG. 9. In situ temperature dependence XRD patterns of $NbN_{0.7(1)}O_{1.3(1)}$, (a) angular range from 34.6 to 36.8 degree; (b) angular range from 50.2 to 53.2 degree.
Figure 9B:
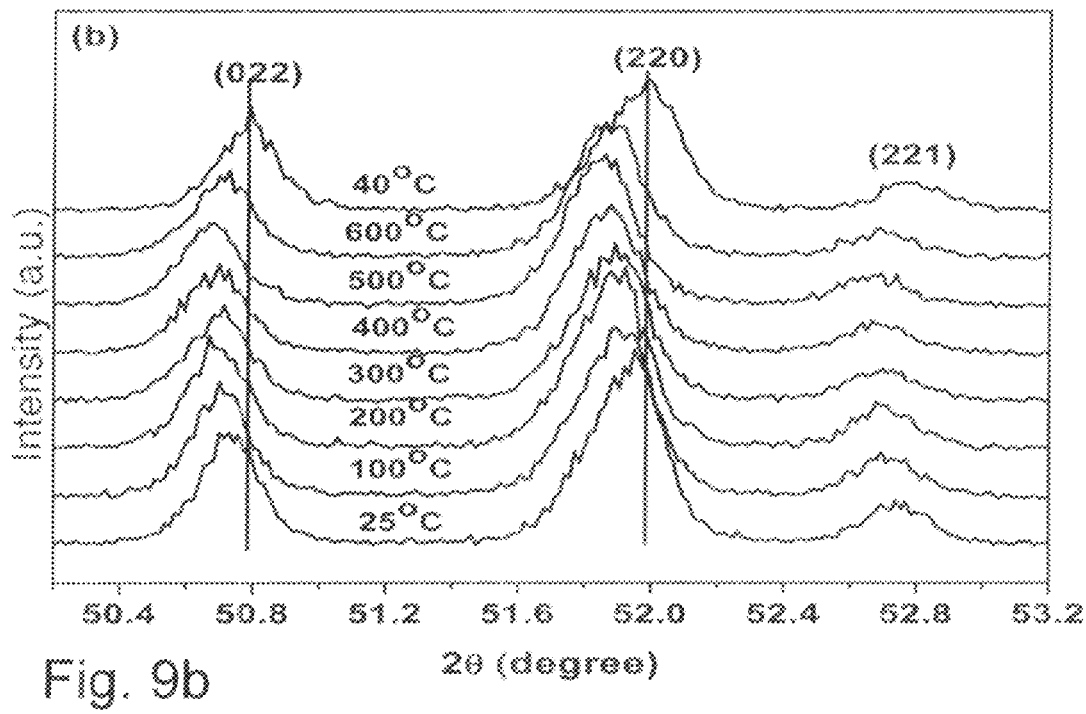
Figure 10:
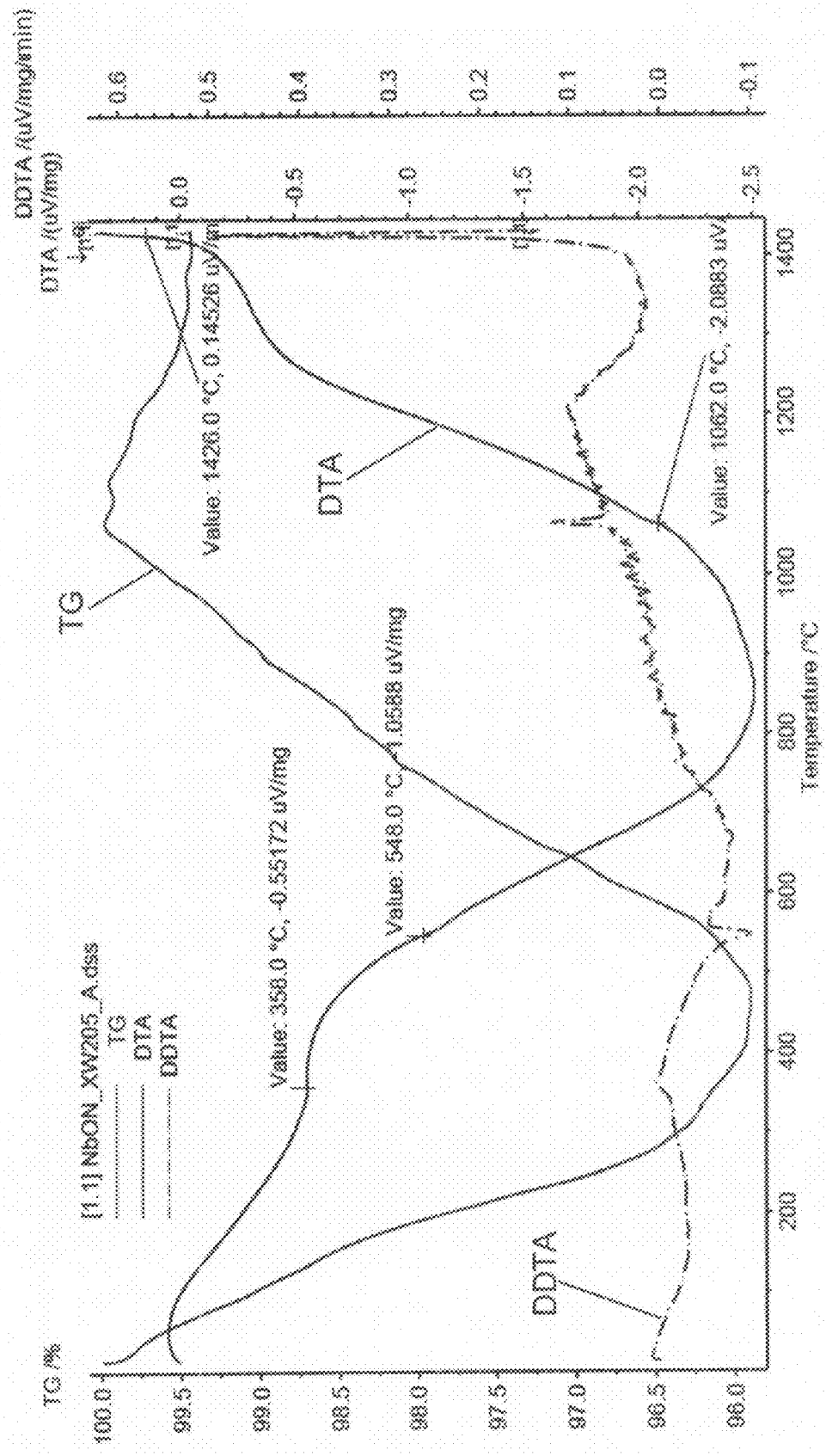
FIG. 10. TG and DTA of $NbN_{0.7(1)}O_{1.3(1)}$

The thermal stability of $NbN_{0.7(1)}O_{1.3(1)}$ as investigated by TG, DTA and temperature dependent XRD. According to the XRD patterns in FIG. 9, the lattice parameters of this compound surprisingly do not change much, but even shrink continuously over the temperature range investigated. Changes of lattice parameters are not considered in the refinement results. This unusual thermal phenomenon attracted the inventors attention because normally heating results in an expansion of the unit cell volume. For example, oxidenitride perovskites $AMO_2N$ (A=Ba, Sr, Ca; M=Ta, Nb) exhibit even higher coefficients of thermal expansion than the corresponding isostructural oxides.[33] It was noticed that changes in octahedral tilting in perovskites contribute more to the thermal expansion coefficient than lattice volume expanding.[34] However, in the monoclinic compound $NbN_{0.7}O_{1.3}$ investigated here, niobium is connected with seven O/N ions to form irregular octahedrons. By comparison with symmetric and regular octahedrons in perovskites, it becomes evident that tilting of $[NbO_3N_4]$ polyhedra hardly affects the thermal expansion of the compounds, whereas extending of Nb—O (N) bonds by heating apparently plays a more important role. Just as H. Shilling et al. reported, baddeleyite and fluorite-type oxidenitrides always have lower volume thermal expansion coefficients than isostructural oxides.[35] So, it is expected that monoclinic $NbN_{0.7(1)}O_{1.3(1)}$ would exhibit significantly low, but positive, coefficients of thermal expansion. However, the TG curve in FIG. 10 shows a signal corresponding to 4% weight loss that happened during the temperature increase from room temperature to 500° C. This was attributed to a $N_2$ release, which had not been detected in TaNO.[35] Apparently, the niobium (V) oxidenitride phase has a lower thermal stability than TaNO. To conclude, $NbN_{0.7(1)}O_{1.3(1)}$ shows nearly zero coefficient of thermal expanding because heating forces the Nb—O/N bonds to stretch while release of $N_2$ contracts the cell volume.

Conversely, as is obvious from the plotted TG curve (FIG. 10), continued temperature increase results in enhancing the weight of the compound by 4% in a temperature range from 500 to 1000 ° C. This weight increase can be attributed to the absorption of $O_2$ into the structure. The yellowish white sample obtained after TG measurement was identified as a $Nb_2O_5$ phase by XRD. From the whole thermal treatment process of $NbN_{0.7(1)}O_{1.3(1)}$, it can be seen that the nitrogen in this niobium oxidenitride is competing with oxygen during heating. Unfortunately, due to its lower electronegativity, nitrogen always stands in the weak side. This also explains why, during the synthesis process as discussed above, using a close system, provides favored conditions for producing oxidenitrides, e.g. $NbN_{0.7(1)}O_{1.3(1)}$, while using an open system, favors oxygen attack of the sample.

3.2.4. Galvanostatic Cycling

The electrochemical performance of pure and lactose treated $NbN_{0.7(1)}O_{1.3(1)}$ against Li was tested and compared under galvanostatic cycling conditions. Considering probably different lithiation mechanisms when applying different potential ranges, two measurements were carried out at two potential cutoffs, 0.05 and 1 V, respectively. The first-discharge was measured from open circuit voltage (OCV) to final potentials and the subsequent charge cycled up to 3 V.

Figure 11A:
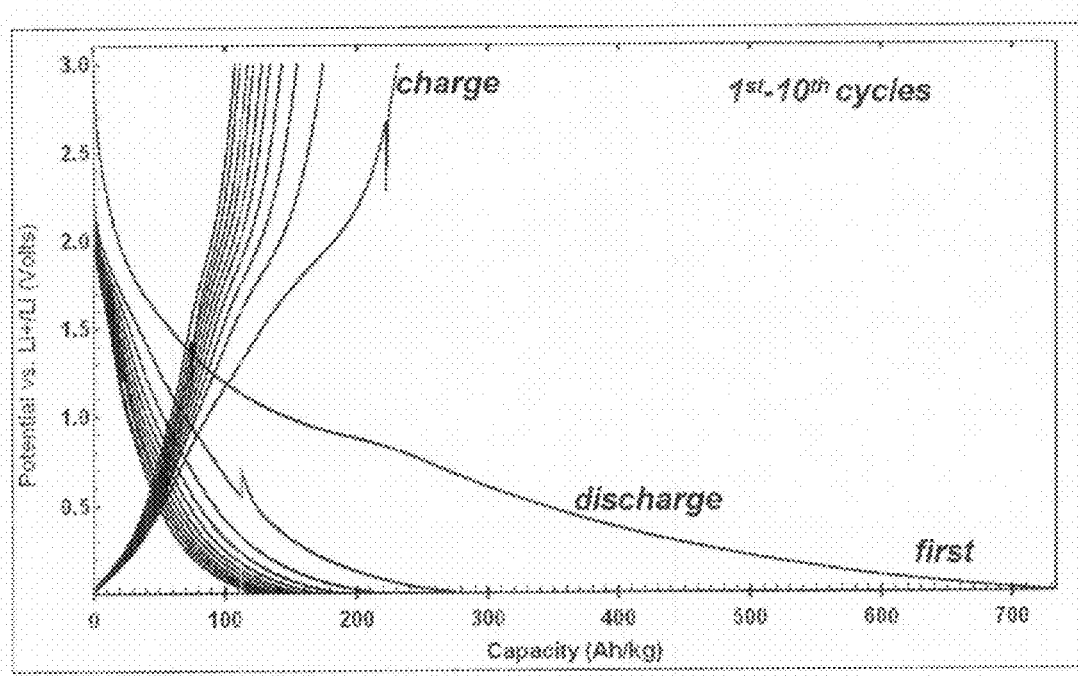
FIG. 11. Voltage vs capacity profiles and corresponding differential capacity plots of pure $NbN_{0.7(1)}O_{1.3(1)}$ in different voltage windows. (a) and (b) voltage 0.01-3V; (c) and (d) voltage 1-3V. All the cycles were performed at a current density of 10 mA/g.

When the potential ends at 0.05V (FIGS. 11a and 12a), the first discharge of $NbN_{0.7(1)}O_{1.3(1)}$ exhibits an extraordinary capacity as high as 500-700 Ah/kg, and then drops rapidly into 200-300 Ah/kg during subsequent circles. Apparently, carbon coated samples show better cycling performance than uncoated samples: the first discharge is followed by cycling with a quite stable capacity around 250 Ah/kg. The first voltage profiles of pure $NbN_{0.7(1)}O_{1.3(1)}$ show sloping plateaus at 0.9 V and below 0.5 V. In contrast, an extra 1.5 V plateau is observed for carbon coated samples. To investigate these potential peaks in detail, their differential capacity curves were plotted in FIGS. 11b and 12b, respectively. First of all, a sharp peak at 0.9 V is shown in the first discharge and then disappears in subsequent cycles. This plateau is observed commonly in electrochemical performance of several molybdates, for instance, $MnMoO_4$ and $CaMoO_4$. The observed plateaus around 0.9 V are ascribed to the breakdown of the metal oxide framework catalytically enhanced by carbon.[36-37] Secondly, the largest contribution to capacity occurs at 0.5-0.05 V because lithium ions are inserted into the lattice and destroy the crystal structure. During the following charge and discharge cycles, this part of the process is reversible to a certain extent.

Figure 11B:
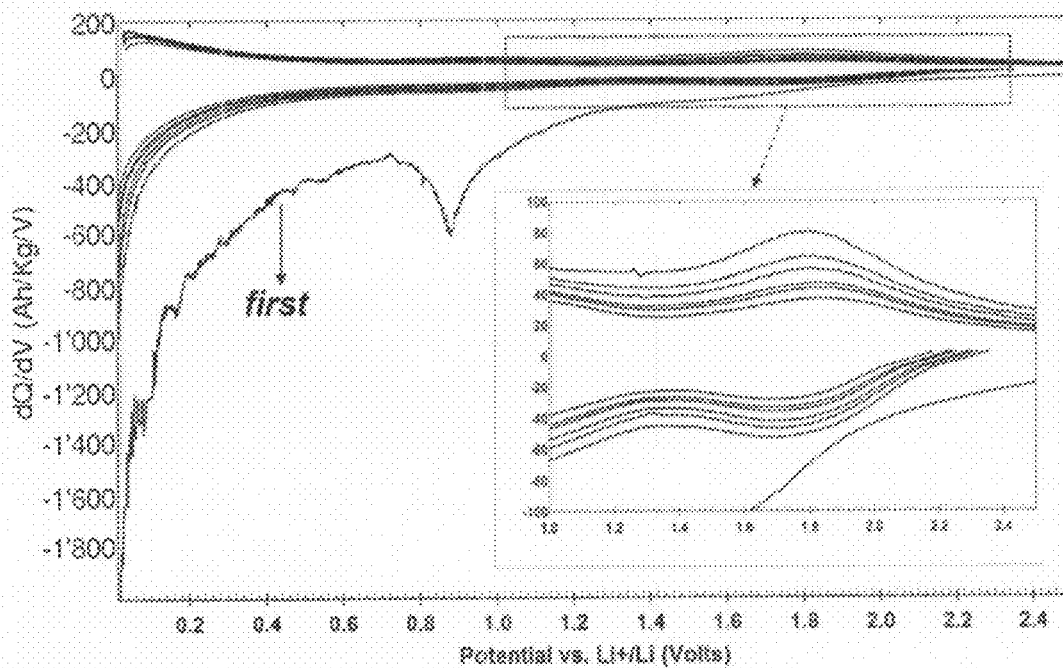
Figure 12A:
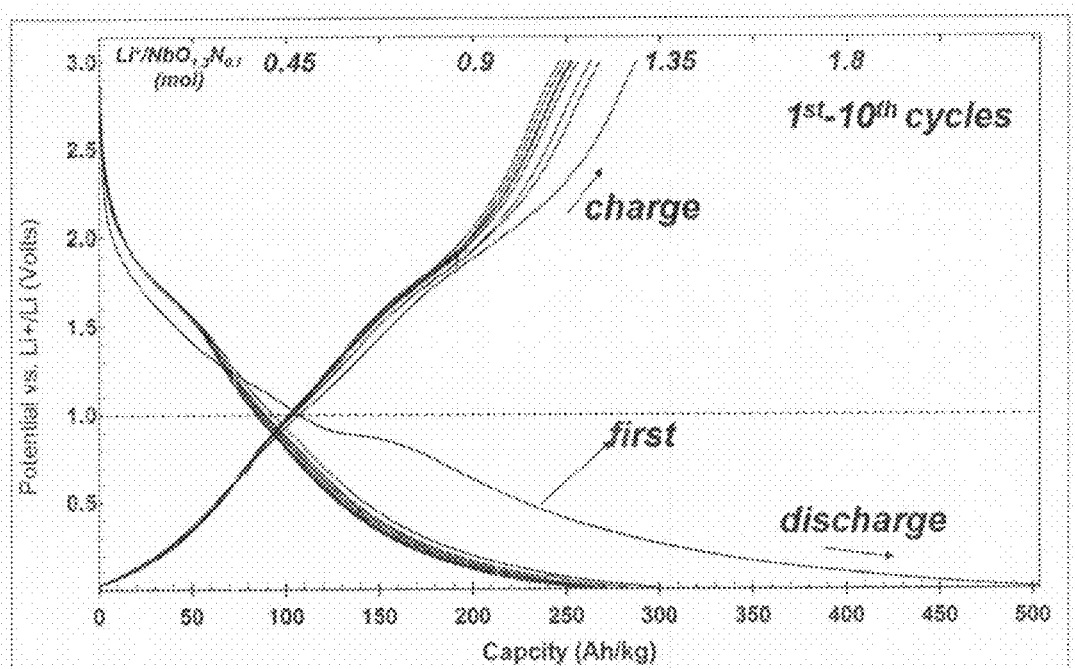
FIG. 12. Voltage vs capacity profiles and corresponding differential capacity plots of $NbN_{0.7(1)}O_{1.3(1)}$ with 4.3% weight of carbon coating in different voltage windows. (a) and (b) voltage 0.01-3V; (c) and (d) voltage 1-3V. All the cycles were performed at a current density of 10 mA/g.
Figure 12B:
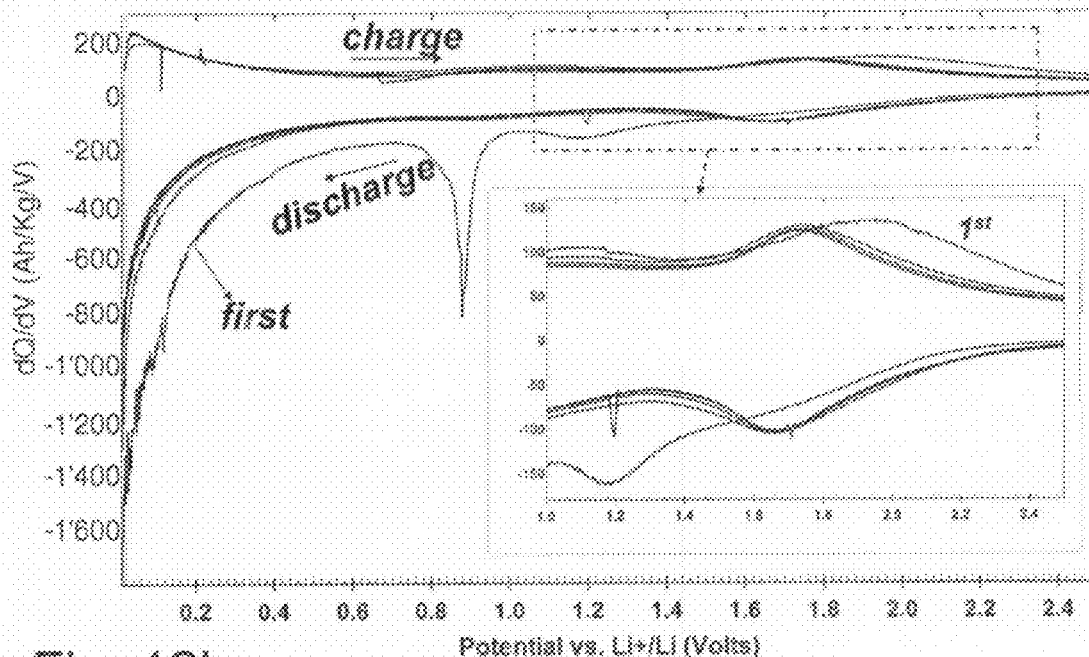

It was further investigated whether lithium ions can be inserted into the voids of the structure of $NbN_{0.7(1)}O_{1.3(1)}$. To answer this question, the reaction around 1.5 V was investigated. As the inset pictures in FIGS. 11b and 12b show, reversible oxidation and reduction peaks around 1.7 V are observed during charge and discharge processes, which is in agreement with the $Nb^{5+}/Nb^{4+}$ redox potential vs. lithium. This behavior is similar to that of other niobates like $Nb_2O_5$, $AlNbO_4$ and $KNb_5O_{13}$.[15-18] In these compounds, the further reduction of $Nb^{4+}/Nb^{3+}$ works at another potential plateau at 1.2 V. However, $NbN_{0.7(1)}O_{1.3(1)}$ only has a $Nb^{4+}/Nb^{3+}$ redox couple in the first cycling which then disappears gradually. Setting the potential cutoff as 1.0 V, as shown in FIGS. 11c and 12c, the (de)lithiation performance is much more stable and reversible than in the potential range 3-0.05 V. Due to the improved electronic conductivity, a carbon-coated sample expectedly had better electrochemical behavior and still kept a capacity of 70-80 Ah/kg in stable running.

The oxidation peaks were found to shift to smaller potential as charge continues. Simultaneously the peaks corresponding to the $Nb^{4+}/Nb^{3+}$ reduction start to fade. This could be explained by the lithium insertion reaction in various environments of the crystal structure. Firstly, lithium is inserted into different voids formed by N/O anions during discharge, and then as more and more lithium is remaining in these specific positions, a different potential is needed to pull out the rest of lithium ions during charging.

Thus, on basis of the discussion above and the previous studies done on other similar niobates and molybdates, a charge-discharge reaction mechanism of $NbN_{0.7(1)}O_{1.3(1)}$ is proposed here. Basically this process could be discussed separately in two potential parts, 0-1V and 1-3V, as marked in FIG. 12a. For the first discharge, from 0V to 1V, insertion of lithium as Li$^+$ into the crystal structure of NbN$_{0.7}$O$_{1.3}$ is assumed. A capacity as high as 110 Ah/kg means around 0.5 Li going into the host, which is described by the following equation:

$$Nb^{4.7+}N_{0.7}O_{1.3} + 0.5Li^+ + 0.5e^- = Li_{0.5}Nb^{4.2+}N_{0.7}O_{1.3} \quad (5)$$

And this reaction is reversible when charge is carried on in the potential ranging 1-3 V. NbN$_{0.7(1)}$O$_{1.3(1)}$ and Nb$_2$O$_5$, have similar oxidation-reduction peaks but there is a wide gap concerning the ability of lithium insertion. No matter which structure Nb$_2$O$_5$ has, as high as 1.6-1.8 mol Li$^+$ is able to be inserted into each mol of Nb$_2$O$_5$, which can be ascribed to the existence of a number of easy-passable tunnels between edge- and corner-shared [NbO$_6$] octahedrons. However, looking into the crystal structure, the space formed among asymmetric [NbO$_3$N$_4$] is irregular, small and hardly fitting lithium ions.

In the second voltage range, 1-0.05 V, the decrease of the potential forces more lithium ions to move into the compound and break down the host structure. Such a conversion below 1.0 volt occurs very commonly in oxide and nitride anodes.$^{4-5,12}$ For these simple oxides or nitrides, it is easily understood that lithium would combine with oxygen or nitrogen and produce Li$_2$O and Li$_3$N, respectively. In the oxidenitride studied here, we assume that lithium prefers the combination with oxygen to produce Li$_2$O, and, at the same time, niobium oxidenitride would be reduced to another thermally stable phase NbO$_{0.3}$N$_{0.7}$. Considering the limited ability of ion transport in the lattice at room temperature, each atom of the obtained compounds would prefer to stay close to their previous positions, and, as a result, amorphous compounds are usually formed. This is the reason why the crystallographic changes of products after conversion reaction cannot be proved by powder XRD. Further, after conversion, lithium ions might be inserted into NbN$_{0.7}$O$_{1.3}$. The whole first-discharge below 1 V can be depicted as below:

$$Li_{0.5}Nb^{4.2+}N_{0.7}O_{1.3} + 1.3Li^+ + 1.3e^- = Li_2O + Nb^{2.7+}N_{0.7}O_{0.3} \quad (6)$$

$$Nb^{2.7+}N_{0.7}O_{0.3} + 0.5Li^+ + 0.5e^- = Li_{0.5}Nb^{2.2+}N_{0.7}O_{0.3} \quad (7)$$

In total, during the first discharge, 2.3 mol Li$^+$ enter into each mol of compound and Nb changes its valency from 4.7+ to 2.2+. It has to be understood that the reaction mechanisms are mere proposals that do not limit the scope of the present invention.

3.3 Conclusions

Oxidenitrides of niobium with 4.7+ oxidation valence were synthesized by decomposition of niobium chloride amide. Two methods were examined, namely the direct decomposition of NbOCl$_3$(NH$_3$)$_4$ and a LiI assisted method. In both ways, pure compounds were obtained and used to characterize their crystal structure, morphoplogy and electrochemical performance against lithium. By using elemental analysis and neutron diffraction, the compound produced was determined to be NbN$_{0.7(1)}$O$_{1.3(1)}$ instead of NbNO. Morphologically samples exhibited the feature as 3-5 nm nano-sized particles, in which some micrometric single crystals were found as well. NbN$_{0.7(1)}$O$_{1.3(1)}$ owned unusual thermal properties, increasing temperature left the lattice parameters nearly constant because of N$_2$ escape from the lattice. The obtained sample NbN$_{0.7(1)}$O$_{1.3(1)}$ was investigated with regard to its electrochemical performance in Li-ion batteries as the first example of a lithium-free transition metal oxidenitride. The experiments support that NbN$_{0.7(1)}$O$_{1.3(1)}$ coated with carbon (e.g. 4.6 weight-% of carbon) had much more stable and revisable cycling performance than the pure, uncoated sample. When the cutoff potential was set at 0.05V and 1V, respectively, the measured capacities reached 500 Ah/kg and 100 Ah/kg during the first discharge and then stabilized at 250 Ah/kg and 80 Ah/kg in subsequent cycling, respectively. The corresponding plausible mechanism has been proposed for the discharge-charge process of this oxidenitride. Although the capacity was needed to be improved, due to the limited ability of lithium insertion in this quite close-packed ZrO$_2$-type structure, their cycling performance showed the potential of transition metal oxidenitrides used as electrodes of lithium batteries, stable reversable cycling and similar potential like oxides for instance. Such a potential provides more opportunities when oxidenitrides are selected as electrode candidates instead of oxides. By doping, like the example of phase transition in Mg—Ta—O—N system,$^{35}$ or by replacing part of the transition metal cations and tuning the contents of oxygen and nitrogen, the lithium insertion is expected to be more efficient and the capacity of such materials improved.

Example 4

Preparation of Nanoparticulate Conductive Binder, i.e. PEDOT Nanostubs, Via Reverse Emulsion Directed Synthesis The technique of reverse microemulsion in the lines of Sun et al.$^{38}$ was employed for the synthesis of PEDOT nanoparticles. Initially 8.5 g (19.12 mmol) of sodium bis(2-ethylhexal)sulfosuccinate (AOT) was dissolved in 70 ml of n-hexane in an ultrasonic bath at 100% power (410 W). Then a mixture of 1.6 g (10.00 mmol) anhydrous FeCl$_3$ in 1 ml distilled water was added dropwise with a Pasteur-pipette. When all the oxidant was added, the resulting solution was taken out of the ultrasonic bath and gently shaken by hand until a milky-yellow precipitate appeared. Then 0.38 ml of ethylenedioxythiophene (EDOT) was added to the emulsion at once. The resulting mixture was then kept at 10° C. in the rotavap for 1 h. Polymerization started when the temperature of the water bath reached about 20° C. After that the temperature of the water bath was maintained at 30° C. for 3 h. Meanwhile the reaction mixture turned green and subsequently black. The product was then suction filtered and washed with ethanol and acetone. Drying at 100° C. over night yielded a blue/black nanopowder of PEDOT.

While there are shown and described presently preferred embodiments of the invention, it is to be distinctly understood that the invention is not limited thereto but may be otherwise variously embodied and practiced within the scope of the following claims.

REFERENCES

1. Goodenough, J. B.; Kim, Y. *Chem. Mater.* 2010, 22, 587.
2. Ellis, B. L.; Lee, K. T.; Nazar, L. F. *Chem. Mater.* 2010, 22, 691.
3. Ariyoshi, K.; Makimura, Y.; Ohzuku, T. Lithium Ion Rechargeable Batteries; Ozawa, K. Eds.; Wiley-VCH Verlag GmbH & Co. KgaA, Weinheim, 2009; Chapter 2.
4. Zhang, W. M.; Wu, X. L.; Hu, J. S.; Guo, Y. G.; Wan, L. J. *Adv. Funct. Mater.* 2008, 18, 3941.
5. Gao, X. P.; Bao, J. L.; Pan, G. L.; Zhu, H. Y.; Huang, P. X.; Wu, F.; Song, D. Y. *J. Phys. Chem. B* 2004, 108, 5547.
6. Nishijima, M.; Takeda, Y.; Imanishi, N.; Yamamoto, O. *J. Sol. Stat. Chem.* 1994, 113, 205.

7. Nishijima, M.; Kagohashi, T.; Takeda, Y.; Imanishi, M.; Yamamoto, O. *J. Power Sour.* 1997, 68, 510.
8. Rowsell, J. L. C.; Pralong, V.; Nazar, L. F. *J. Am. Chem. Soc.* 2001, 123, 8598.
9. Cabana, J.; Stoeva, Z.; Titman, J. J.; Gregory, D. H.; Palacin, M. R. *Chem. Mater.* 2008, 20, 1676.
10. Nishijima, M. Tadokoro, N.; Takeda, Y.; Imanishi, N.; Yamamoto, O. *J. Electrochem. Soc.* 1994, 141, 2966.
11. Sun, Q.; Fu, Z. W. *Electrochemical and Solid-State Letters,* 2008, 11, A233.
12. Das, B.; Reddy, M. V.; Malar, P.; Osipowicz, T.; Rao, G. V. S.; Chowdari, B. V. R. *Solid State Ion.* 2009, 180, 1061.
13. Kubiak, P.; Pfanzelt, M.; Geserick, J.; Hörmann, U.; Hüsing, N.; Kaiser, U.; Wohlfahrt-Mehrens, M. *J. Power Sour.* 2009, 194, 1099.
14. Borghols, W. J. H.; Wagemaker, M.; Lafont, U.; Kelder, E. M.; Mulder, F. M.; *J. Am. Chem. Soc.* 2009, 131, 17786.
15. Kodama, R.; Terada, Y.; Nakai, I.; Komaba, S.; Kumagai, N. *J. Electrochem. Soc.* 2006, 153, A583.
16. Wei, M.; Wei, K.; Ichihara, M.; Zhou, H. *Electrochem. Commun.* 2008, 10, 980.
17. Reddy, M. A.; Varadaraju. U. V. *Chem. Mater.* 2008, 20, 4557.
18. Han, J. T.; Liu, D. Q.; Song, S. H.; Kim, Y.; Goodenough, J. B. *Chem. Mater.* 2009, 21, 4753.
19. Wendel, J.; Lerch, M.; Laqua, W. *J. Solid State Chem.* 1999, 142, 163.
20. Orhan, E.; Tessier, F. Marchand, R. *Solid State Sci.* 2002, 4, 1071.
21. Logvinovich, D.; Hejtmanek, J.; Knizek, K.; Marysko, M.; Homazava, N.; Tomes, P.; Aguiar, R.; Ebbinghaus, S. G.; Reller, A.; Weidenkaff, A. *J. Appl. Phys.* 2009, 105, 023522.
22. Cabana, J.; Rousse, G.; Fuertes, A.; Palacin, M. R. *J. Mater. Chem.* 2003, 13, 2402.
23. Cabana, J.; Dupre, N.; Grey, C. P.; Subias, G.; Caldes, M. T.; Marie, A. M.; Palacin, M. R. *J. Electrochem. Soc.* 2005, 152, A2246.
24. Elder, S. H.; DiSalvo, F. *J. Chem. Mater.* 1993, 5, 1545.
25. Niewa, R.; Jacobs, H. *Chem. Rev.* 1996, 96, 2053.
26. Brauer, G.; Weidlein J.; Strähle, J. *Z. Anorg. Allg. Chem.* 1966, 348, 298.
27. Clarke, S. J.; Chalker, P. R.; Holman, J. H.; Michie, C. W.; Puyet, M.; Rosseinsky, J. *J. Am. Chem. Soc.* 2002, 124, 3337.
28. Weishaupt M.; Strähle, J. *Z. Anorg. Allg. Chem.* 1977, 429, 261.
29. Lummey, M. W.; Dronskowski, R. *Z. Anorg. Allg. Chem.* 2003, 629, 2173.
30. Larson, A. C.; von Dreele, R. B. *General Structure Analysis System;* Los Alamos National Laboratory, 1994.
31. Wang, Y.; Lesterb, E.; Gregory, D. H. *J. Mater. Sci.* 2007, 42, 6779.
32. Bedanta, S.; Kleemann, W. *J. Phys. D: Appl. Phys.* 2009, 42, 013001.
33. Kim, Y.; Woodward, P. M.; Baba-Kishi, K. Z.; Tai, C. W. *Chem. Mater.* 2004, 16, 1267.
34. Megaw, H. D. *Mater. Res. Bull.* 1971, 6, 1007.
35. Schilling, H.; Lerch, M.; Borger, A.; Berker, K. D.; Wolff, H.; Dronskowski, R.; Bredow, T.; Tovar, M.; Baehtz, C. *J. Sol. Stat. Chem.* 2006, 179, 2416.
36. Sharma, N.; Shaju, K. M.; Rao, G. V. S.; Chowdari, B. V. R.; Dong, Z. L.; White, T. *J. Chem. Mater.* 2004, 16, 504.
37. Kim, S. S.; Ogura, S.; Ikuta, H.; Uchimoto, Y.; Wakihara, M. *Solid State Ion.* 2002, 146, 249.
38. Yong-Jun Li, Wei-Jun Huang, and Shi-Gang Sun, Angewandte Chemie, 118, 2599 (2006).
39. Fedorkovaa, A.; Orinakovab, R.; Orinakb, A.; Taliana, I.; Heilec, A.; Wiemhöferd, H. D.; Kanianskya, D. and Arlinghausc, H. F. Journal of Power Sources, 2010, 195, 3907.
40. Ge, Y.; Yan. X.; Liu, J.; Zhang, X.; Wang, J.; He, X.; Wang, R. and Xie, H. Electrochimica Acta, 2010, 55, 5886.
41. Robertsa, M. R.; Vitinsb, G.; Wowen, J. R. Journal of Power Sources, 2008, 179,754.
42. Kim, Y. and Woodward, P. M. journal of Solid State Chemistry, 2007, 180, 3224.
43. Zhang, L.; Xu, Y.; Jin, D. and Xie, Y. Chemistry of Materials, 2009, 21, 5681.
44. Papakondylis, A. and Sautet, P. Journal of Physical Chemistry, 1996, 100, 10681.
45. Deiss, E. Electochimia Acta, 2005, 50, 2927.

The invention claimed is:
1. A lithium ion battery, comprising:
an electrode, comprising:
a conductor; and
an electrode coating comprising an electronically active material, said electronically active material consisting of a transition metal (T) oxidenitride of formula $Li_xT^I_mT^{II}_nN_yO_z$ in form of nanoparticles,
wherein x=0-3, y+z=2-4, y>0, z≥0.25, m+n=1, m=0-1, n=0-1,
one of $T^I$ and $T^{II}$ is Nb, and the other of $T^I$ and $T^{II}$ is selected from the group consisting of Zn, Mo, V, Cr, W, Ni, Co, Fe, and Cu, and
when $T^I$ represents Nb, m is not zero, and when $T^{II}$ represents Nb, n is not zero.
2. The lithium ion battery of claim 1, wherein $T^I$ and $T^{II}$ are in their highest oxidation stage and x is 0.
3. The lithium ion battery of claim 1, wherein m is 0.5 to 1 and n is 0.5 to 0.
4. The lithium ion battery of claim 1, wherein m=1 and n=0.
5. The lithium ion battery of claim 1, wherein the nanoparticulate electronically active material is conductively coated.
6. The lithium ion battery of claim 1, wherein the nanoparticulate electronically active material is bonded by a carbonacious product obtained by pyrolysis.
7. The lithium ion battery of claim 1, wherein the nanoparticulate electronically active material is bonded by a nanoparticulate conductive binder.
8. The lithium ion battery of claim 1,
wherein $T^I$ is selected from the group consisting of Zn, Nb, Fe, and Cu, and
wherein said transition metal oxidenitride is a nitrogen doped transition metal oxide.
9. The lithium ion battery of claim 1, wherein the electrode material comprises a nanoparticulate conductive filler.
10. The lithium ion battery of claim 5, wherein the nanoparticulate electronically active material is conductively coated with a carbonacious product obtained by pyrolysis.
11. A lithium ion battery, comprising:
an electrode, comprising:
a conductor; and
an electrode coating comprising an electronically active material, said electronically active material consisting of a transition metal (T) oxidenitride of formula $Li_xT^I_mT^{II}_nN_yO_z$ in form of nanoparticles, wherein x=0-3, y+z=2-4, y>0, z≥0.25, m+n=1, m=0-1, n=0-1, and wherein the transition metal (T) oxidenitride consists of at least one of NbON and $NbN_{0.7}O_{1.3}$.

12. lithium ion battery of claim 1, wherein $T^I$ and $T^{II}$ are each independently transition metals selected from the group consisting of Nb, Cr, Ni, Co, and Cu.

* * * * *